US006324522B2

(12) United States Patent
Peterson et al.

(10) Patent No.: US 6,324,522 B2
(45) Date of Patent: Nov. 27, 2001

(54) ELECTRONIC INFORMATION NETWORK FOR INVENTORY CONTROL AND TRANSFER

(75) Inventors: Larry C. Peterson, Holland; Steven E. Kwiatkowski, Perrysburg, both of OH (US)

(73) Assignee: MRO Software, Inc., Bedford, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,705

(22) Filed: Sep. 15, 1998

Related U.S. Application Data

(60) Provisional application No. 60/058,824, filed on Sep. 15, 1997.

(51) Int. Cl.[7] .................................................. G06F 17/60
(52) U.S. Cl. .............................. 705/28; 705/22; 705/26; 705/29
(58) Field of Search .............................. 705/28, 22, 29, 705/10, 26

(56) References Cited

U.S. PATENT DOCUMENTS

| 4,459,663 | * | 7/1984 | Dye ........................................... 705/29 |
| 4,591,983 |   | 5/1986 | Bennett et al. ........................... 705/29 |
| 4,646,238 | * | 2/1987 | Carlson, Jr. et al. .................... 705/28 |
| 4,656,591 |   | 4/1987 | Goldberg ................................. 705/28 |
| 4,799,156 | * | 1/1989 | Shavit et al. ............................. 705/28 |
| 4,827,423 |   | 5/1989 | Beasley et al. .................. 364/468.02 |

(List continued on next page.)

FOREIGN PATENT DOCUMENTS

| 0637809 A | * | 2/1995 | (EP) ........................................ 705/28 |
| 0637 809 A |   | 2/1995 | (EP) ........................................ 705/28 |
| 2249416 A | * | 5/1992 | (GB) ........................................ 705/28 |
| WO 90 11572 A |   | 10/1990 | (WO) ...................................... 705/28 |
| WO 90/11572 A | * | 10/1990 | (WO) ...................................... 705/28 |
| WO 99/28805 | * | 6/1999 | (WO) .................................. G06F/1/00 |

OTHER PUBLICATIONS

"Integrated Supply Holds Promise for Wholesaler Sales Improvements", Air Conditioning Heating & Refrigeration News, vol. 199, Issue 17, p. 5–6, Dec. 23, 1996.*

Cohodas, Marvin, "IPOWER Distributor Alliance Eases MRO Procurement", Electronic Buyers'News, Issue 1043, p. 44, Feb. 3, 1997.*

"ERP/MRP II", IIE Solutions, vol. 29, Issue 5, p. 92, May 1997.*

Morris et al, "The Changing Manufacturing Environment: Implications for Marketing", Journal of Business & Industrial Marketing, vol. 7, No. 2, pp. 21–30, 1992.*

(List continued on next page.)

Primary Examiner—James P. Trammell
Assistant Examiner—John W. Hayes
(74) Attorney, Agent, or Firm—Foley Hoag & Eliot, LLP; Jason C. Gish

(57) ABSTRACT

A process for distributing items, especially industrial maintenance repair and operating (MRO) parts and supplies. The process includes as a first step providing a plurality of vendors for selling the item. Next, an information network by which each vendor can communicate to the other vendors a current inventory quantity and a current price of the item each of the vendors has for sale. A last step includes establishing an agreement among the vendors in which a first vendor agrees to sell to a second vendor, upon demand at a future point in time, up to the then current inventory quantity of the item at the then current price communicated over the information network by the first vendor to the second vendor

4 Claims, 19 Drawing Sheets

U.S. PATENT DOCUMENTS

| | | | | |
|---|---|---|---|---|
| 4,887,208 | * | 12/1989 | Schneider et al. | 705/28 |
| 4,947,028 | * | 8/1990 | Gorog | 705/38 |
| 4,958,292 | * | 9/1990 | Kaneko et al. | 705/29 |
| 4,992,940 | * | 2/1991 | Dworkin | 705/26 |
| 5,089,970 | | 2/1992 | Lee et al. | 364/468.02 |
| 5,197,001 | | 3/1993 | Mukherjee | 705/29 |
| 5,204,821 | * | 4/1993 | Inui et al. | 705/29 |
| 5,210,686 | | 5/1993 | Jernigan | 705/29 |
| 5,212,791 | | 5/1993 | Damian et al. | 705/29 |
| 5,216,594 | | 6/1993 | White et al. | 705/28 |
| 5,260,866 | | 11/1993 | Lisinski et al. | 705/29 |
| 5,283,829 | | 2/1994 | Anderson | 380/24 |
| 5,287,267 | * | 2/1994 | Jayaraman et al. | 705/28 |
| 5,295,067 | | 3/1994 | Cho et al. | 705/29 |
| 5,299,115 | * | 3/1994 | Fields et al. | 705/10 |
| 5,334,822 | * | 8/1994 | Sanford | 705/28 |
| 5,361,199 | | 11/1994 | Shoquist et al. | 705/26 |
| 5,367,452 | | 11/1994 | Gallery et al. | 705/28 |
| 5,402,336 | * | 3/1995 | Spiegelhoff et al. | 705/28 |
| 5,412,576 | | 5/1995 | Hansen | 705/29 |
| 5,424,938 | | 6/1995 | Wagner et al. | 705/42 |
| 5,434,791 | | 7/1995 | Koko et al. | 364/468.03 |
| 5,450,317 | * | 9/1995 | Lu et al. | 705/28 |
| 5,475,585 | | 12/1995 | Bush | 705/26 |
| 5,515,267 | | 5/1996 | Alsenz | 364/188 |
| 5,557,518 | | 9/1996 | Rosen | 705/17 |
| 5,594,639 | | 1/1997 | Atsumi | 364/468.14 |
| 5,621,797 | | 4/1997 | Rosen | 380/24 |
| 5,630,070 | | 5/1997 | Dietrich et al. | 705/8 |
| 5,638,519 | | 6/1997 | Haluska | 705/28 |
| 5,642,419 | | 6/1997 | Rosen | 380/23 |
| 5,666,493 | * | 9/1997 | Wojcik et al. | 705/26 |
| 5,708,780 | | 1/1998 | Levergood et al. | 709/229 |
| 5,712,989 | * | 1/1998 | Johnson et al. | 705/28 |
| 5,715,314 | | 2/1998 | Payne et al. | 380/24 |
| 5,717,989 | * | 2/1998 | Tozzoli et al. | 705/37 |
| 5,724,424 | | 3/1998 | Gifford | 380/24 |
| 5,727,164 | * | 3/1998 | Kaye et al. | 705/28 |
| 5,758,327 | * | 5/1998 | Gardner et al. | 705/26 |
| 5,758,328 | * | 5/1998 | Giovannoli | 705/26 |
| 5,765,143 | * | 6/1998 | Sheldon et al. | 705/28 |
| 5,854,746 | * | 12/1998 | Yamamoto et al. | 705/28 |
| 5,914,878 | * | 6/1999 | Yamamoto et al. | 705/28 |
| 5,940,807 | * | 8/1999 | Purcell | 705/26 |
| 6,006,199 | * | 12/1999 | Berlin et al. | 705/26 |
| 6,023,683 | * | 2/2000 | Johnson et al. | 705/26 |
| 6,081,789 | * | 6/2000 | Purcell | 706/26 |
| 6,115,641 | * | 9/2000 | Brown et al. | 705/26 |

OTHER PUBLICATIONS

O'Mahony D. et al, "X.500 Directory Services Support for Electronic Data Interchange (EDI)", Computer Networks and ISDN Systems, vol. 27, No. 5, pp 691–701, XP000495014, Mar. 1995.*

Numetrix, Ltd., "Numetrix Introduces Intelligent Visibility for Effective Supply Chain Management; Client Server Systems Improve Organizational Decision–Making Through Collaborative, Enterprise–Wide Integration", Business Wire, Dialog File 16:PROMT, Sep. 1995.*

Numetrix, Ltd., "Numetrix Announces the Release of its Intelligent Dynamic Distribution", Business Wire, Dialog File 16:PROMT, Oct. 1995.*

Greenbaum, Joshua M. "Efficient Consumer Response: How Software is Remaking the Consumer Packaged Goods Industry", Software Magazine, vol. 16, No. 6, p. 38, Jun. 1997.*

Maintenet, Maintenet User Guide, 1996, 106 pages.

Maintenet, Maintenet User Guide, Published prior to Sep. 15, 1996, 133 pages.

Maintenet, Various Marketing Brochures, Published prior to Sep. 15, 1996, 34 pages.

IBM, "Maximizing MRO Purchasing in Today's Marketplace," Published prior to Sep. 15, 1996, 14 pages.

Lynn et al., "Integrated Supply–a new channel of distribution," 1996, 51 pages.

Mahoney et al., "X.500 directory services support for Electronic Data Interchange", 1995, 12 pages.

O'Mahony D. et al.: "X.500 Directory Services Support for Electronic Data Interchange (EDI)", Computer Networks and ISDN Systems, vol. 27, No. 5, Mar. 1, 1995, pp. 691–701, XP000495014.

* cited by examiner

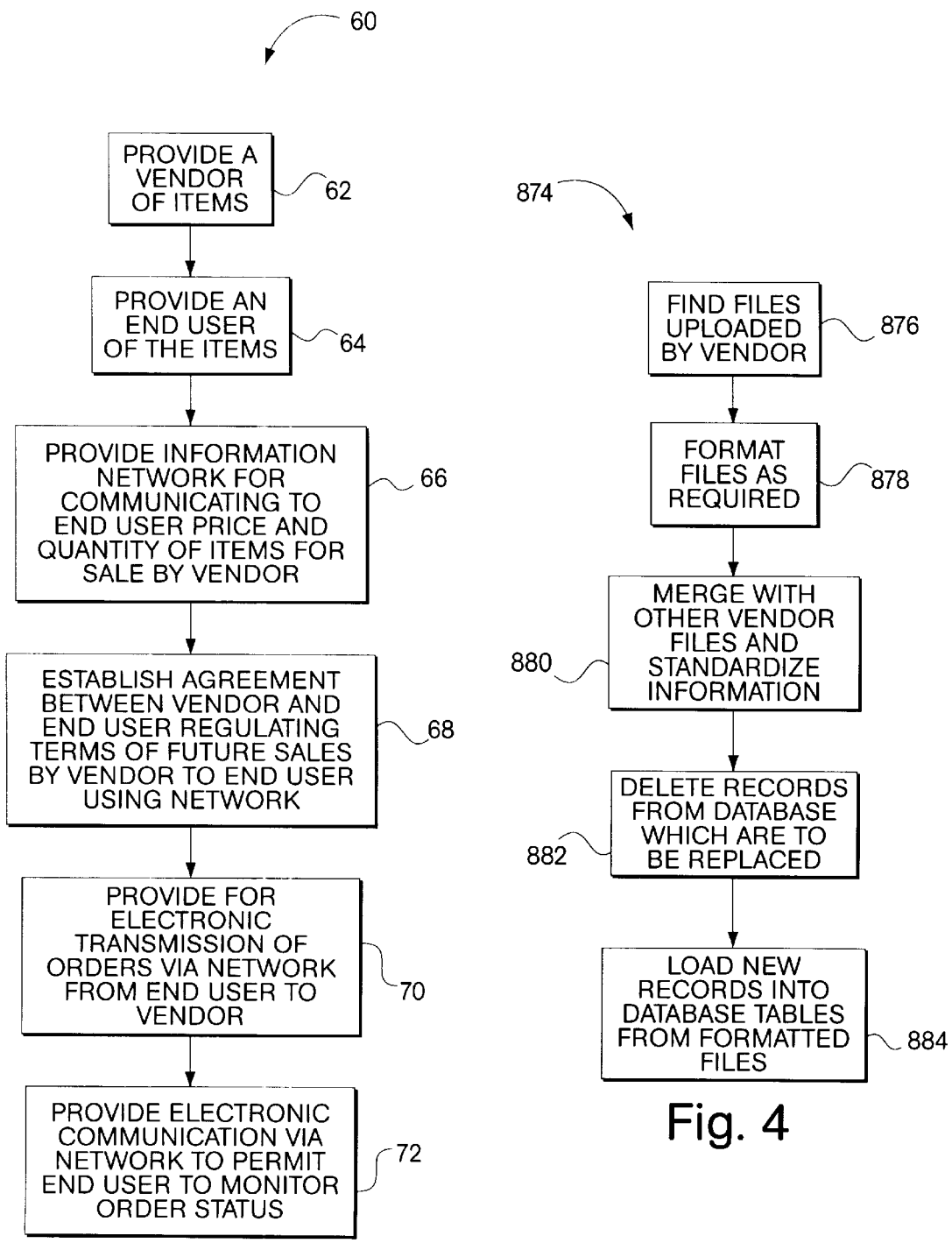

ELECTRONIC INFORMATION NETWORK FOR INVENTORY CONTROL AND TRANSFER

This application claims the benefit of U.S. provisional application No. 60/058,824, filed Sep. 15, 1997.

BACKGROUND OF THE INVENTION

This invention relates in general to distribution networks for distributing parts from a manufacturer, through vendors, to end-users. More particularly, the invention relates to integrating a maintenance supply network with an information network for selectively distributing information about inventory levels and pricing among vendors, manufacturers, and end users, and efficiently transferring inventory between parties according to prearranged terms.

Maintenance Repair and Operating (MRO) supplies are traditionally transferred from a manufacturer to end users (customers needing MRO supplies for maintaining equipment, rather than for resale) through a network of vendors. These vendors (distributors) are typically not mere order takers, but are expected to have some expertise in the product lines carried to enable the vendor to perform such tasks as recommending parts for various customer applications, assisting in the design of these applications, and assisting in the maintenance of these resultant installations. Vendors typically are franchised to supply MRO supplies for a specific manufacturer within a defined geographic area. End users within that geographic area desiring to purchase MRO supplies from that manufacturer are directed to the vendor for the area. Therefore, the vendor is expected to maintain an inventory on hand of the various MRO supplies of the manufacturer to meet the ordinary needs of the end users within the geographic area. Thus, a vendor may have to carry in inventory a larger quantity of infrequently used parts, which is expensive. Furthermore, if an end user desires a part that the vendor does not have on hand in inventory, the vendor will need to find a source for the needed part. The vendor may contact the manufacturer to see if the manufacturer has the part on hand. Frequently, however, the vendor may find that another vendor will have the part in inventory, and be able to sell the part to the vendor for resale to the end user on an expedited basis. The vendor may spend a long time telephoning a number of fellow vendors looking for another vendor who has the part in stock. If the vendor locates another vendor with the part in stock, an ad-hoc negotiation for purchasing and shipping the part must be conducted.

The manufacturer will normally have information about how many of the needed part were sent to various vendors, but typically will not be able to tell with precision the current number of parts held by individual vendors in the distribution network, or the total number of parts in the distribution network. Allocation of manufacturing resources to produce the part is normally based on extrapolation of historical activity, and not an actual determination of a current number of the parts held in the distribution network.

SUMMARY OF THE INVENTION

This invention relates to a process for integrating a maintenance supply network with an information network for selectively distributing information about inventory levels and pricing among vendors, and efficiently transferring inventory between parties according to prearranged terms. A plurality of vendors (distributors) of an item is provided with an information network for communicating among the vendors information about the quantity of the item each vendor has in inventory. Preferably, the price of the item as determined by each vendor for sale to other authorized distributors is also shared. More preferably, binding agreements are established between various ones of the vendors that regulate the terms of future sales of the item between the parties to the agreements.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a block diagram similar to FIG. 1 illustrating a process for establishing a system for electronic commerce between a vendor and an end user.

FIG. 4 is a block diagram illustrating a process for maintaining computer files of inventory information shared on the network of FIG. 1.

DETAILED DESCRIPTION OF THE PREFERRED EMBODIMENT

Preliminarily, it should be noted that in the following discussion, the term "vendor" means a party that sells an item to another party. Principally, vendors are distributors who sell the item to their customers. Customers are principally end users of the item, who use the item in maintenance or repair, rather than for subsequent transfer to other parties. However, when considering a transaction between a manufacturer and the manufacturer's distributor, the manufacturer is the vendor and the distributor is the customer. Distributors can also be customers of other distributors, for example, when purchasing parts from another distributor for resale to end users.

Figure 1:
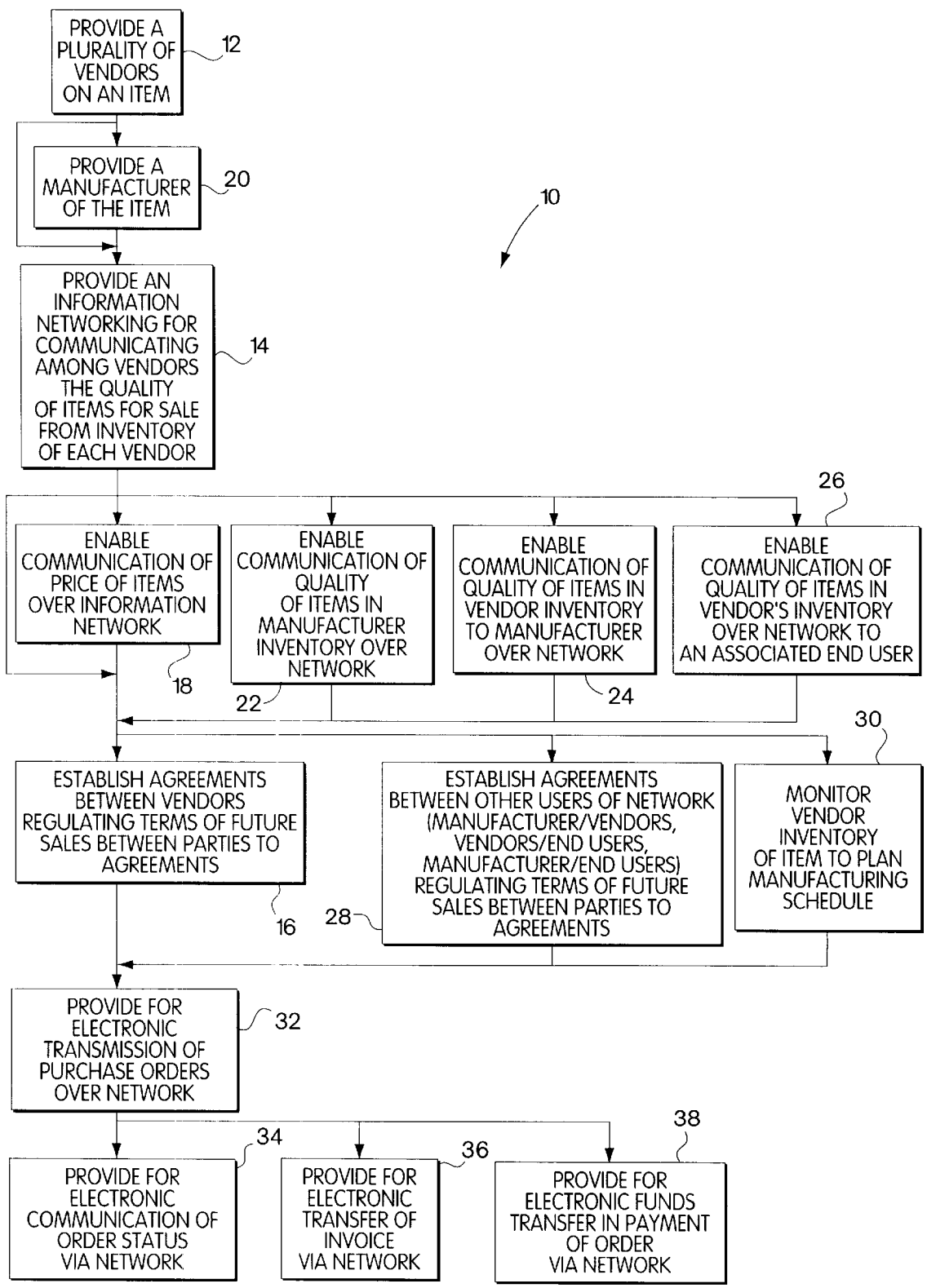
FIG. 1 is a block diagram illustrating a process for establishing an integrated MRO network according to the present invention.

Referring now to the drawings, there is illustrated in FIG. 1 a process, indicated generally at 10, for establishing a distribution network, and more particularly, an integrated Maintenance Repair and Operating (MRO) supplies distribution network, according to the present invention.

In a first step 12, a plurality of vendors of an item is provided. These vendors, in a preferred embodiment of the invention are independent industrial MRO supply distributors. Each vendor is a separate business entity, and normally will have no common ownership. Each vendor is authorized by the manufacturer of an item to distribute the item within respective geographic areas. Additionally, each vendor may carry for sale other products made by other manufacturers. Some of these products may be carried by more than one of the vendors, but not be carried by all of the vendors.

In a second step 14, the vendors are interconnected by an information network through which the vendors can communicate among themselves the quantity of the item that each vendor has for sale, e.g., the inventory of the item each of the vendors has. A vendor may, of course, underreport the total number of the item that the vendor possesses, if, for example, the vendor wishes to ensure that the vendor has some quantity of the item on hand for sale to the vendor's local clients.

In a third step 16, the vendors enter into agreements (bilateral or multilateral contracts) among themselves governing an inventory sharing arrangement among the parties to the agreements. It is contemplated that not all of the vendors will enter into an agreement with every other vendor, although this may occur. According to the agreement, at least some aspects of anticipated future sales of the item by one party to the agreement to another party to the agreement would be regulated by the terms of the agreement. For example, the agreement may specify a time by which payment must be received following a sale of the item from one vendor to another vendor who are also co-signatories to the agreement regulating such sales of the item.

This arrangement permits the vendors in need of one or more of the item to quickly determine, using the information network, which of the other vendors have some of the item. Knowing which of the other vendors are co-signatories to the inventory sharing arrangement, the vendor needing the item can contact a co-signatory who has some of the item in stock, to facilitate a speedy transaction transferring the item to the vendor who needs the item.

In a step 18, the vendors also share an asking price associated with the items they have in their respective inventories. The agreements signed by the various vendors will preferably indicate that a first vendor will sell to a second vendor up to the quantity of the item that the first vendor had indicated as being in the first vendor's inventory at the asking prices communicated by the first vendor. This will help assure a rapid transfer of the item from the first vendor to the second vendor upon request by the second vendor, since virtually all the issues tending to hinder a rapid sale are dealt with ahead of time in the agreement.

In a step 20, a manufacturer for the item is provided. It is contemplated that multiple manufacturers may be provided who manufacture various different item, such as in Buying Group Inventory Networks, as will be described below. In a step 22, the information network is enhanced to enable the manufacturer (or manufacturers) to communicate over the information network, to the vendors, the quantity of the item that is in the manufacturer's inventory. This helps the vendors more readily understand the availability of the item in from not only the other vendors, but also from the manufacturer. The manufacturer is preferably also able to communicate a price for the items in the manufacturer's inventory over the information network.

In a step 24, the information network is enabled to communicate information about the various vendors' inventory to the manufacturer. This enables the manufacturer to more efficiently plan shipping of the item to those areas where supplies are low, and demand is high. As will be discussed with respect to FIG. 2, knowledge of the quantity of an item in the vendor level of the distribution network also enables a novel process for manufacturing the item.

In a step 26, the information network is further enhanced to enable communication about the quantity (and preferably the price) of the item in a particular vendor's inventory to that vendors customer. This degree of communication facilitates an inventive Electronic Commerce feature of the present invention, whereby orders for the item from the end user (customer) can be placed electronically with the vendor.

In a further step 28, agreements regulating future sales of the item are established between other users of the information network. For example, such agreements may be made between the manufacturer and one or all of the vendors; between a vendor and the vendor's customers (end users); or between the manufacturer and end users (as may occur when the end user is a particularly large and significant user of the item). In a step 30, the manufacturer is provided with the needed equipment and information to monitor the inventory in the distribution system (especially vendor's inventory of the item) to plan a manufacturing schedule. This will be further discussed below with respect to FIG. 2.

In a step 32, the information network is used to transmit purchase orders between users of the information network. A vendor may receive such an electronic purchase order from a customer who previously signed an agreement regulating the terms of such a sale, or another vendor who is co-signatory with the first vendor of such an agreement. This Electronic Commerce feature will be further discussed below, especially with respect to FIG. 15.

In a step 34 the information network provides for electronic communication of the status of purchase orders submitted to a vendor. Such purchase orders will preferably be purchase orders submitted electronically as in the step 32 above, but may be conventionally transmitted purchase orders, i.e., orders transmitted by conventional means such as mail, facsimile, or telephone.

In a similar manner, in a step 36 the information network is provided with the capability transferring an invoice electronically. When a vendor has responded to a purchase order for an item by shipping out the item, the data of the purchase order, such as the purchase order number, the name of the customer ordering the item and the customer's address, a list of items ordered and the quantity of each, is readily available. Such information in electronic form can easily be imported into, or rearranged into an electronic invoice, to which the vendor adds a minimal amount of additional information, such as total cost, including taxes, shipping, and handling charges. This invoice can be quickly sent back to the customer via the information network for lower cost and greater speed than conventional mail.

As indicated in step 38, it is contemplated that the information network could be further enhanced to provide for Electronic Funds Transfer (EFT), or to facilitate EFT. More specifically, after a vendor has shipped the requested item to a customer, the vendor would transfer the invoice to the customer electronically, and the customer's money would be electronically transferred into the vendor's account, and the invoice would be marked as paid.

Figure 2:
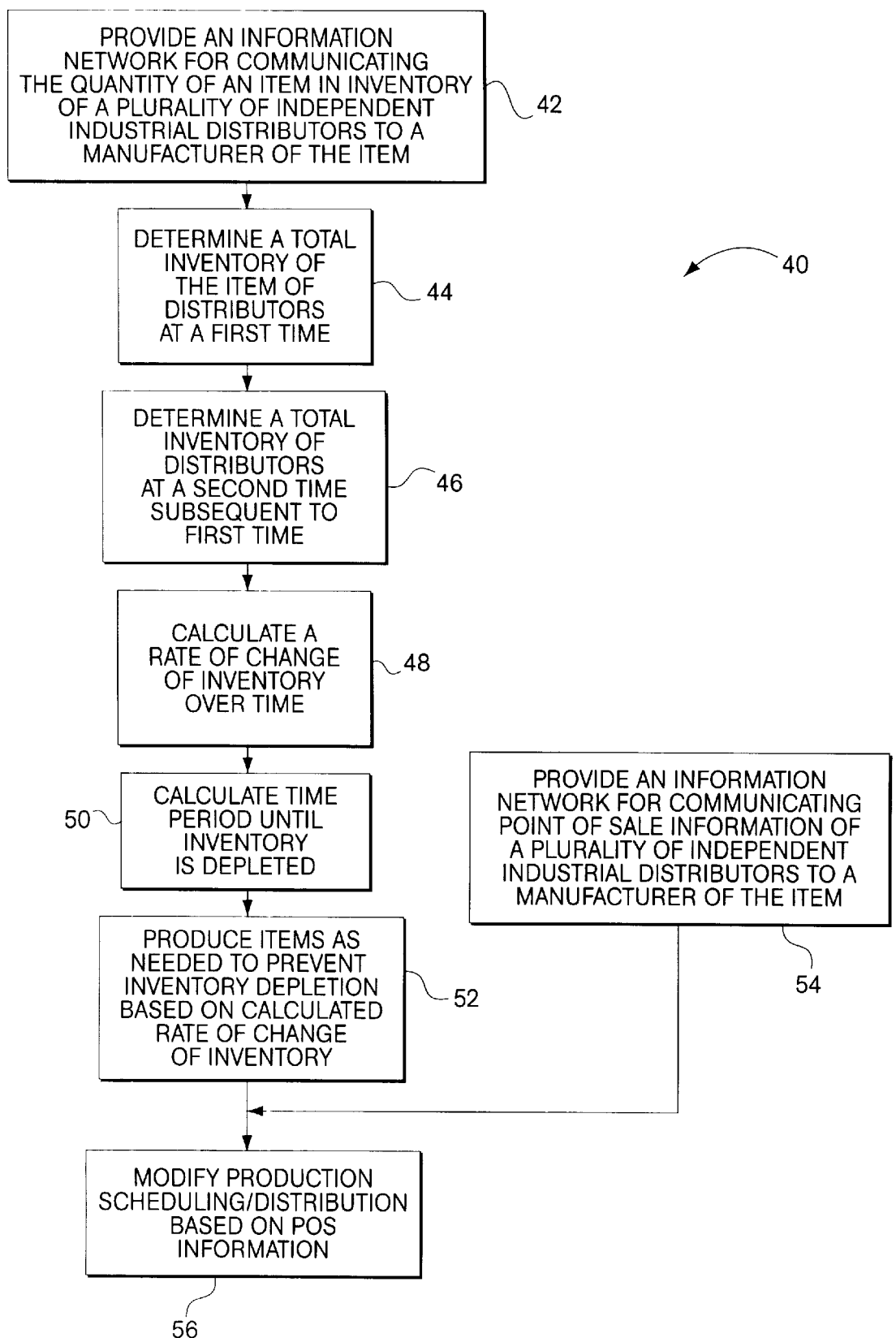
FIG. 2 is a block diagram illustrating a method according to the invention for managing manufacturing capacity based on measured inventory depletion rate.

Referring now to FIG. 2, a method of manufacturing an item based on observing inventory levels in a distribution network is illustrated generally at 40. In a first step 42, an information network is established providing communication between the vendors who constitute the distribution network for an item and a manufacturer of the item. The information network is used to transmit information to the manufacturer about the amount of the item that each of the vendors has in inventory. The total of all the vendors' inventory of the item (plus any stock that the manufacturer has on hand) constitutes the volume of the item in the distribution channels. The vendors' customers are buying the item out of the vendors' stock on an ongoing basis. If the manufacturer stops producing the item, the inventory in the distribution system will decline until the inventory is depleted. (For the purposes of this application, inventory depletion is defined as an unacceptably low level of inventory, which causes customers to have unacceptably high difficulty in obtaining a needed item in an acceptable period of time).

In a step 44, the manufacturer determines a total inventory of the item possessed by the vendors and the manufacturer at a first time.

In a step 46, the manufacturer determines a total inventory of the item possessed by the distributors and the manufacturer at a second time, subsequent to the first time.

In a step 48, the manufacturer calculates a rate of change of the inventory of the item in the distribution system with respect to time.

In a step 50, the manufacturer calculates a time period until inventory depletion based on the calculated rate of change in inventory between the first time and the second time.

In a step 52 before the time period calculated in the step 50 expires, the manufacturer manufactures the item at a rate to prevent inventory depletion of the item. The rate of manufacture may be adjusted based on changes in the rate of sales of the item to customers, for example.

In a step 54, point of sale information can be provided to the information network, and particularly to the manufacturer. Information about the location, time, and quantity of items sold would be useful, in regional aggregates to the manufacturer. For example, the manufacturer can better plan distribution of the manufacturer's inventory about the distribution area in anticipation of future orders from those vendors who are experiencing high rates of sales, and lowering inventories. Indeed, in a step 56, the manufacturer can modify both production scheduling and distribution based on the more detailed information about the location of sales. For example, if inventory had decreased rapidly in the system as a whole, but the sales are all to one customer to build a new plant, which was now complete, the manufacturer may choose not to increase production rates, or not restart a shut-down production line before a previously planned date, as the manufacturer might otherwise consider, since the rapid inventory decrease would now slow.

Now referring to FIG. 3, there is illustrated therein a process indicated generally at 60, for performing electronic commerce between a vendor and an end user customer of the vendor. The first step 62 establishes the vendor as a vendor of one or more items. The step 64 establishes the end user as an end user of the item sold by the vendor. In the step 66, an information network is utilized to communicate to the end user the price and quantity of items for sale by the vendor to the customer. In a step 68, an agreement is established between the vendor and the end user regulating the terms of future sales by the vendor using the information network. Typically, this agreement covers such items as terms for payment, shipping methods, and agreements for the vendor to sell the item at the vendor's then currently communicated price on demand of the end user.

The demand for sale by the end user maybe through an order electronically transmitted via the information network to the vendor, if the network is thus enabled in a step 70.

Finally, in a step 72, the information network enabled to permit the end user to monitor the order processing by the vendor. This means that the end user will be able to check on the status of the order at least periodically to see when the vendor has begun to work on the order, when the order is complete, when and where the order was shipped, and whether all the ordered items were able to be shipped.

Figure 5:
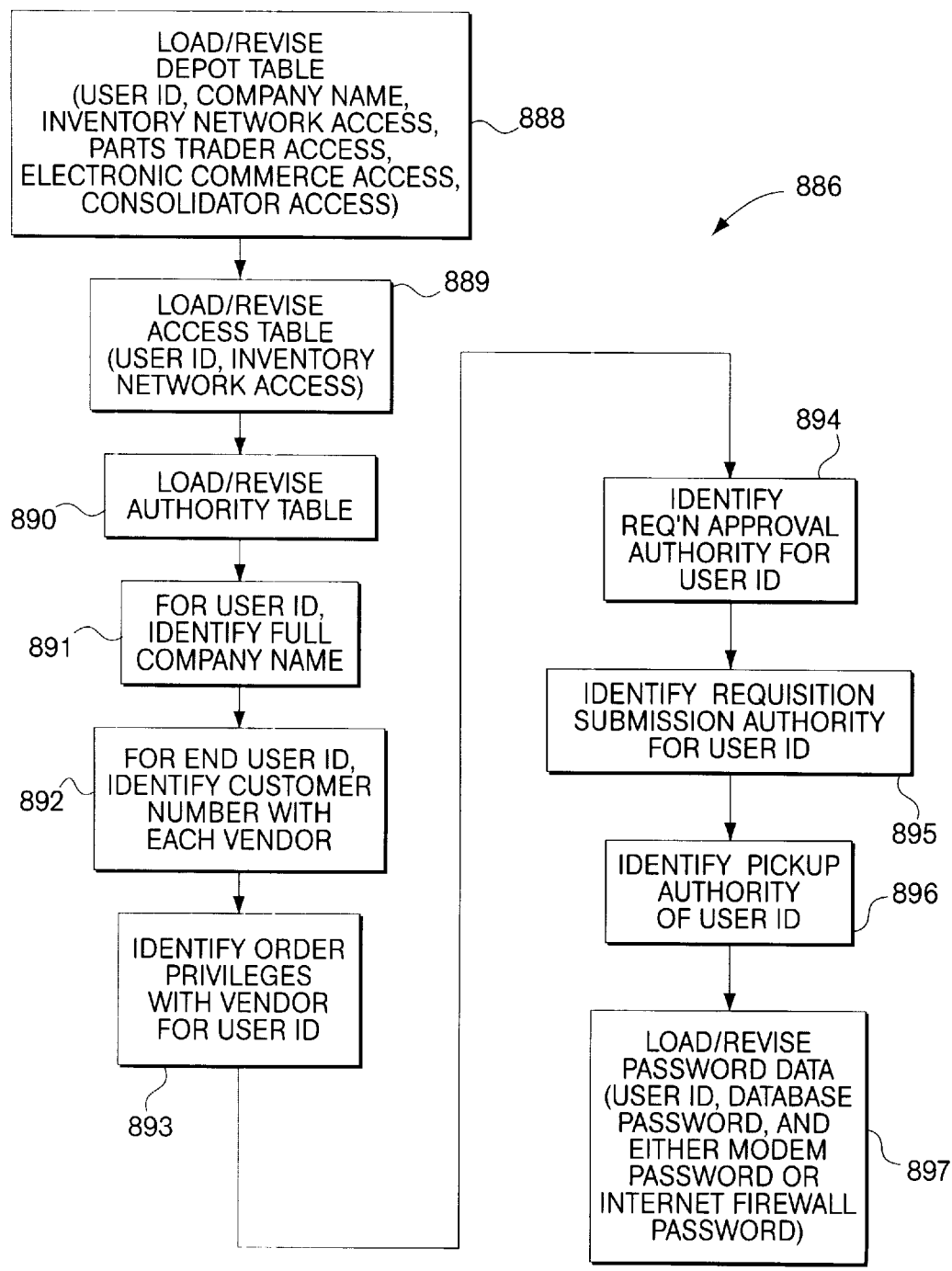
FIG. 5 is a block diagram illustrating a process for maintaining access controls for the network of FIG. 1.
Figure 6:
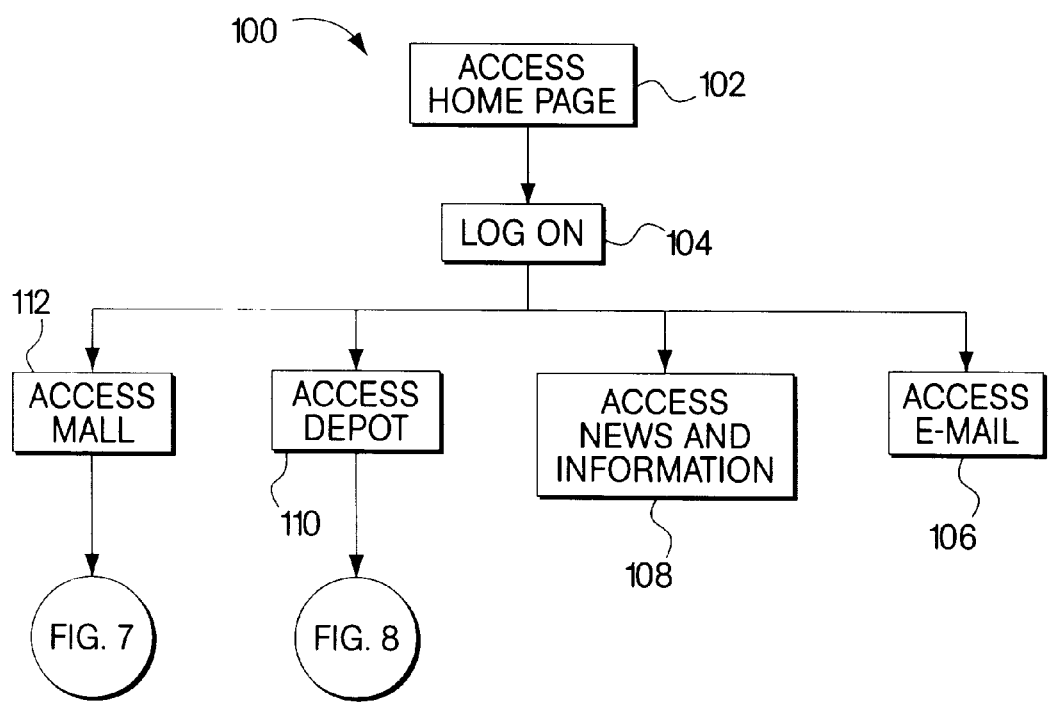
FIG. 6 is a partial block diagram of a process of accessing an information network according to a preferred embodiment.

Referring now to FIG. 6 (FIGS. 4 and 5 are discussed below, near the end of the Specification, under the heading "NETWORK MAINTENANCE"), a preferred embodiment of a process for operating an information network according to the invention is illustrated generally at 100. A first step 102 in the process 100 is to use a computer to connect to the information network through a graphical interface commonly known as a home page. The computer used to access the home page in the preferred embodiment is programmed with suitable "browser" software, such as NETSCAPE NAVIGATOR®, made by Netscape Communications Corporation, of Mountain View, Calif. Preferably, the browser has been customized for use with the information network, with such features as pre-stored bookmarks or home page addresses related to the information network.

Access to the home page can be gained in any suitable conventional fashion, such as dial-up access to a modem connected to the information network, or access to the information network through an interface with the Internet global computer network. Once the computer is in communication with the information network, a log-on page is displayed on the user's computer. In the next step 104, the user "logs on" (gains access) to the information network by entering a user name and password in the appropriate field of the log-on page. Access is granted to the information network if the user name and password entered match data stored in the information network. The home page is displayed when access to the information network is gained by the user. The home page, and the other pages of the information network site accessed by the user through the home page, displays information to the user, and will typically indicate various functions which the user can access by actuating a graphic "button". As is typical, in the preferred embodiment such buttons are actuated by moving a graphic input device, such as a computer mouse or trackball, to point to the button with a cursor and clicking, or actuating, a switch on the graphic input device. This is commonly referred to as "clicking" on the graphic button. In the following discussion, the use of a mouse as a graphic input device for controlling the operation of a cursor will be assumed, as will be the use of the "mouse buttons" (switches) typically provided on a mouse, as will be the use of a graphical interface for accessing the information network. It is contemplated, however, that any suitable interface device could be used to communicate user input to the information network. It is also contemplated that non-graphical interface programs can be used to access the functions of the information network, with textual (alphanumeric) information displayed on the user's computer page. In such a case, access to different functions of the information network could be gained through instructions entered from the user's computer keyboard; the use of function keys to speed operations in this mode of use is contemplated.

In the preferred embodiment, the information network home page is composed of a series of buttons. Each button is active and, when clicked on with a mouse, will navigate the user to information or services. In the preferred embodiment, buttons are provided on the right hand side of the page to represent the points of access to various services on the information network, as discussed below. "Quick Link" buttons to the various pertinent services are positioned along the bottom of most screens or pages. Additionally, on the home page, and subsequent pages of the information network site, navigation buttons are preferably provided at the top of the user's page. The navigation button "Home Page" links back to the information network home page. The "Back" button returns the user back to the previous page.

As the user chooses menu options that link the user to different pages, the user will see that, where possible, navigation buttons have been provided which link the user to the previous menu hierarchy. In addition, an indicator, slightly larger than the navigation buttons, is displayed to indicate which page the user is currently reviewing. For example, the "Mall" indicator is presented on the main information network Mall page, and the "Depot" indicator is displayed when the user navigates to the main Depot page. These indicators are not active. In other words, these indicators do not enable the user to navigate to another page when the user clicks on them, but merely act to identify the current information network function being accessed.

Preferably, standard features are used to indicate active links. An active link means that if the user clicks on that button or word the user will be linked to another page. When the user moves his or her mouse to move the cursor over an active link, the cursor will change from an arrow to a pointing hand. When a word, or group of words, is an active link, the word or words will be underlined. Finally, in some cases when the user passes the cursor over an active link, instructions are presented in the status bar of the browser software display. These instructions tell the user where the user will navigate to if the user clicks on the button with the user's mouse.

Typically, the home page will provide access to various "help" functions (not shown). For example, in the preferred embodiment, buttons are provided on the left side of the page, which, when clicked, present information about the information network Mall, Depot, and News & Information functions. Preferably, the information network includes an electronic mail (E-mail) function through which the user can send and receive electronic messages, as shown at 106. The user can select a graphic button to access general news and information, such as information about the information network in a step 108. The user can also gain access to a set of Depot functions from the home page, as shown at 110. The Depot will be further explained below with reference with FIG. 8. The user can also gain access to a set of Mall functions from the home page, as shown at 112.

MALL

Figure 7:
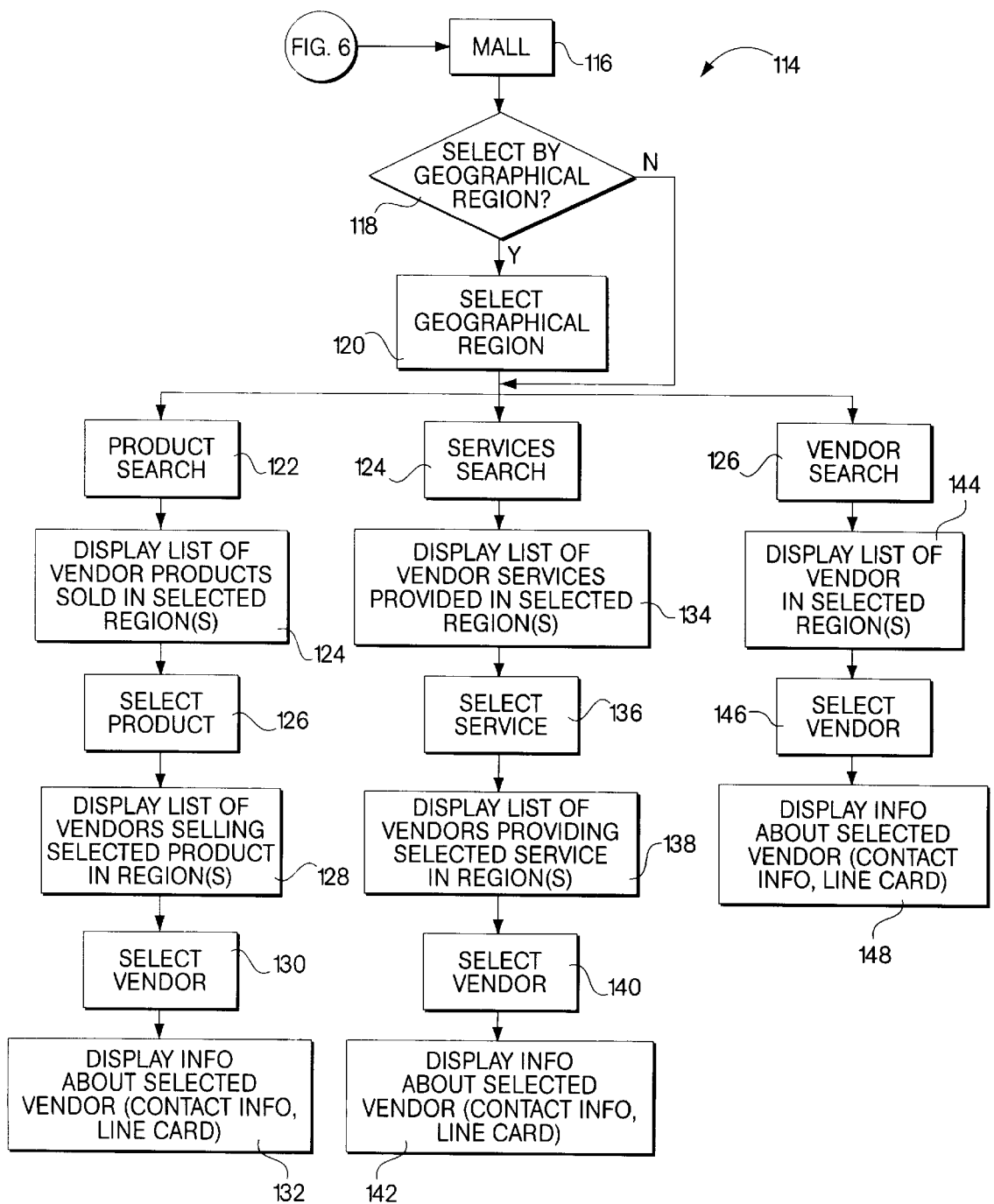
FIG. 7 is a block diagram illustrating an electronic Mall function of the information network.

Referring now to FIG. 7, the Mall functions of the information network are illustrated generally at 114. The Mall portion of the site contains information on all of the vendors (distributors) and manufacturers that use the information network. While in the Mall, the user can search for and access specific information on each vendor and manufacturer, including products and services, sample sales contacts, and how to establish a "buying connection".

By clicking on the information network Mall button in step 112 (FIG. 6), the user is presented with the main Mall page 116. The page is divided into three sections: Banner, Search Criteria area, and Instructions. The Banner is comprised of the following: the information network logo graphic, which is not an active link; the navigation button which takes the user back to the information network home page; and the (inactive) Mall indicator that tells the user which page the user is currently viewing. Preferably, the Banner also is programmed to display the user's company logo or name, which is determined from the user's name supplied during the log-on step 104. The Search Criteria area is where the user indicates what product, service, or vendor the user is searching for, and the geographic region of interest to the user. The Instructions area is where instructions advising the user in the operation of the Mall function. Preferably, any display in the information network site that could be confusing to the user will be provided with instructions, and the display of instructions will not be further discussed below.

In step 118, the user indicates whether the results of the search to be conducted should be restricted to a particular geographic region, or whether all regions should be included in the search. To locate vendors that service a specific geographical region in which the user is interested, step 120, the user clicks on a "Select A Region" button. The user is presented with a map of the geographic regions serviced by the information network. The region names are also preferably listed next to the map as selections. Preferably, the list of regions also includes a menu choice of "all regions" in the event that the user changes his or her mind about selecting only a particular region for the search. The user indicates the region of interest either by either clicking on the corresponding location on the map, or on the region name on the list next to the map.

If, in the step 118, the user wishes to locate all vendors for all regions, the user does not click the "Select A Region" button. Note that the "Select A Region" function may be accessed following any of the Mall search functions described below, to modify the geographic restrictions of the Mall search functions, if desired. In the preferred embodiment, the geographic restrictions applied to Mall search functions will remain in effect until modified by selecting a different geographic restriction, or until the user logs off from the information network.

The Mall page also presents the user with choices to search for vendors selling a particular type of product, 122, vendors providing a particular type of service, 124, or a general list of vendors interacting with the information network, 126.

To conduct a product search 122, the user clicks on the "Products" button on the information network Main Mall page. The user will be presented with an alphabetical listing of all of the products that at least one vendor offers on the information network, as indicated at 124. The list indicates all possible products without restriction by region. When a desired product category is selected for which no vendor exists within a region selected in step 120, in a preferred embodiment, an appropriate message is displayed; the display may alternatively display a blank list to indicate that no vendors of the selected product category exist within the region selected in step 120. When a list is displayed, the user can scroll down the list until the user locates the product the user is looking for. To assist the user to move quickly to the location of the product on the alphabetical list of products, the user is also presented with a graphical listing of the alphabet. By clicking on the alphabet letter that the product name begins with, the user is moved to the beginning of the portion of the alphabetical list of products whose names begin with the selected letter. For example, to locate "Relays", the user clicks on the letter "R" in the alphabetical list. The user is immediately moved to all products that start with the letter "R".

Once the user has located the product name in the list, the user selects the product, in step 126, by clicking on the selected product using the user's mouse. In step 128, the user will be presented with a list of all vendors that sell that product, within the selected region, or in all regions, as selected above by the user.

To review information about one of the vendors on the list, the user selects a vendor, step 130, by clicking on their name, which is underlined, or clicking on their logo, which is preferably displayed next to their names.

In step 132, the user is presented with several pages of general information about the selected vendor, including the name of a designated contact person, telephone and fax numbers, addresses, and the line card of the vendor. The line card is a listing of the product lines carried by the vendor.

The search function for services is similar to the search function for products described above in steps 122 through 132. Searching for vendors that offer a specific service is initiated in step 124 by clicking on the "Services" button.

In step 134, the user is presented with an alphabetical listing of all of the services that at least one vendor offers on the information network. The user selects a service of interest in step 136, in a fashion similar to selecting a product in the step 126. As described above with respect to selection of a product, if a region was selected in the step 120, and no provider of the selected services exist within the region, this will be indicated, preferably by an appropriate message. A list of vendors providing the selected service in the selected region(s) is displayed in step 138, preferably with their logo. The user clicks on the name or logo of a vendor to select the vendor in step 140. In step 142, the contact information and line card for the selected vendor are then displayed to the user.

The third Mall search function is to search for vendors offering products or services on the information network without restricting the search to particular products or services. This search function is initiated in step 126 by clicking on the "vendors" button. A list of all of the vendors offering services or products on the information network, within the selected region(s) is displayed in step 144. To review information about one of the vendors in the list, click on the vendor name, or click on their logo, to select the vendor in step 146. In a step 148, the information network displays several pages of general information about the vendor, including their line cards.

DEPOT

Referring again to FIG. 6, from the information network home page, the user can access the Depot function of the information network by clicking on the "Depot" button on the home page in the step 110. Preferably, a similarly functioning "Depot" button is displayed on selected other pages of the information network site, such as the main Mall page 116.

Figure 8:
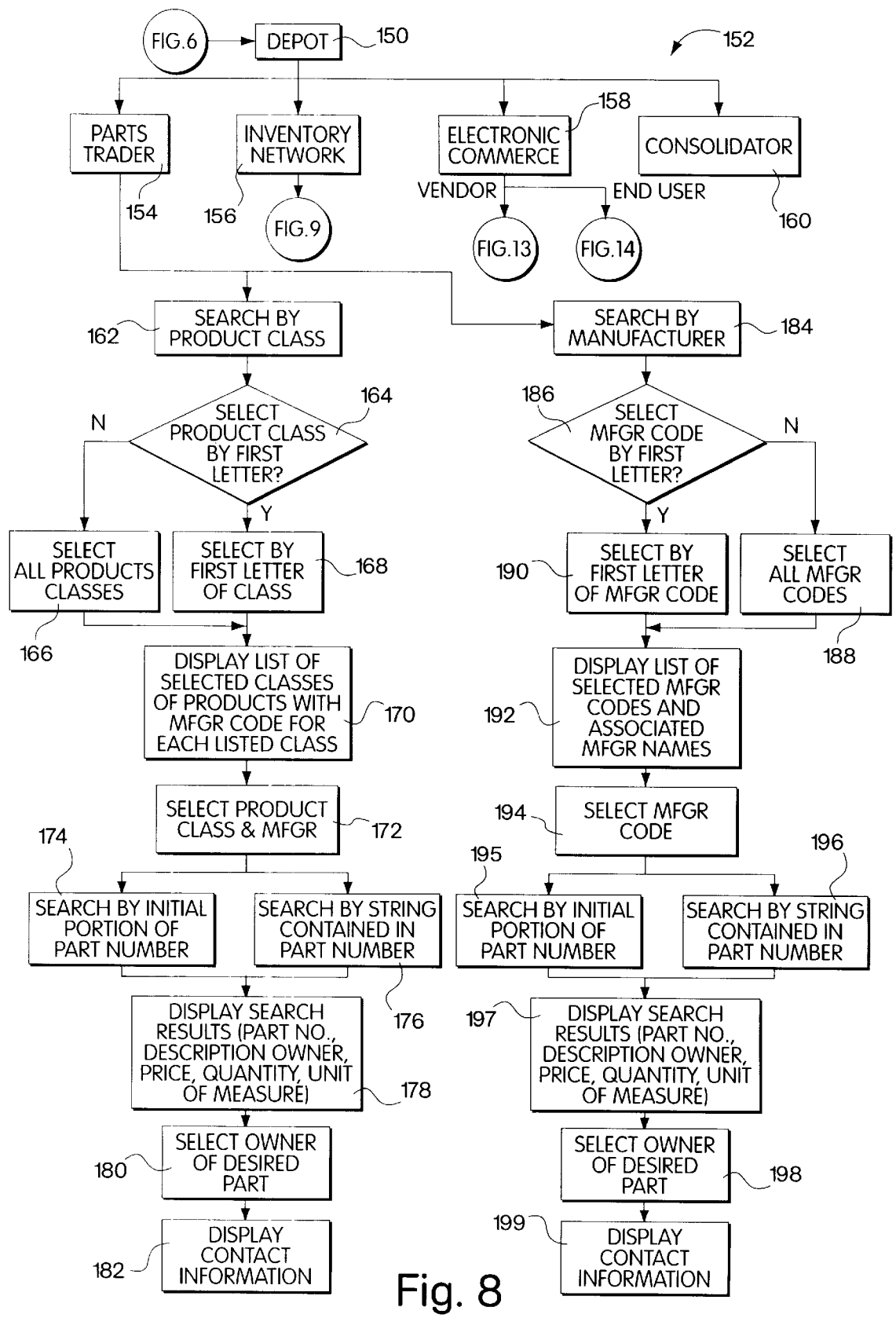
FIG. 8 is a block diagram illustrating a surplus part trading function of the information network.

Referring now to FIG. 8, clicking the "Depot" button in the step 110 causes the main Depot page 150 to be displayed. The potential Depot functions that a user may be granted access to are illustrated generally at 152. In a step 154, the user may click on a "Parts Trader" button to access a Parts Trader function which facilitates sale of items to all users of the information network, as will be further described below. In a step 156, the user may click on an "Inventory Networks" button to access an Inventory Network function in which information about the inventory of other vendors may be obtained, as will be further described below. In a step 158, the user may click on an "Electronic Commerce" button to access an Electronic Commerce function for facilitating the transmission or receipt of sales orders for products over the information network, as will be described in detail below. In a step 160, the user may click on a "Consolidator" button to access a Consolidator function for consolidated purchasing of items from various vendors for a single customer, as will be further described below.

Not every user is able to access each of these Depot functions 152. The Depot is dynamically generated according to authorization (privileges) defined for every information network end user. Privilege definitions are further described below in the section entitled "NETWORK MAINTENANCE". Each end user whether the end user is a customer, a vendor, or a manufacturer will be provided with a unique Depot which links to the business partners that the end user uses on the information network. Based on the end user's log-on identification (ID), specific business partners are assembled according to the type of business transactions performed between the two parties. For example, all of the business partners from which an end user purchases product or a vendor receives purchase orders will be assembled under the heading "Electronic Commerce" in the end user's Depot. Similarly, all business partners with whom the vendor shares inventory will be assembled under the heading "Inventory Networks".

A customer's Depot contains all of the suppliers (vendors or manufacturers) that they purchase items from via the information network. A vendor's Depot contains all of the other vendors that they share inventory with, and any vendor or manufacturer that they buy items from. A manufacturer's Depot contains the group of vendor's that they share inventory with.

The main Depot page 150 is divided into three sections: a Banner, a Menu area, and a Quick Link area. The Banner is comprised of the following: the information network logo graphic, which is not an active link; the navigation button which takes the user back to the information network home page; and the (inactive) Depot indicator that tells the user which page the user is currently viewing. Preferably, the Banner also is programmed to display the user's company logo or name, which is determined from the user's name supplied during the log-on step 104.

The Menu Section presents the services to which the user has access. As previously indicated, not all end users have the same privileges. For example, some vendors may have elected to share inventory information with other vendors but may not have elected to purchase items over the information network. In such cases, their Depots would present them with only the Inventory Network and the Parts Trader menu options.

The Quick Link area is provided with buttons to other services (such as to the Mall page 116, or to the News and Information page) which are positioned along the bottom of the page.

PARTS TRADER

The Parts Trader is an information network service available as a Depot function. It is a listing of products and materials for sale to any user of the information network. Typically, these are items such as discontinued, surplus, or obsolete items which an information network user wishes to sell at a reduced prices. While in the Parts Trader, the user can search for items by product class (what kind of product the item is, such as a hose, or a valve, or a lubricant). The user can alternatively search for items by manufacturer. Once the Product Class or manufacturer has been located, the final search is done by entering all or part of the Model or Part Number.

Once the user has selected the Parts Trader function in the step 154, the main Parts Trader page is displayed. The main Parts Trader page is divided into three sections: Banner, Search Criteria area, and Quick Link area. The Banner and the Quick Link areas are similar to the Banner and Quick Link areas of the main Depot page 150, described above, with the addition of the navigation button "Depot" which takes the user back to the main Depot page 150 in the Banner. The Search Criteria region is where the user indicates how the user is searching for product with the Parts Trader function (e.g., by product class or by manufacturer).

If the user wishes to locate all product offered within a specific product class, the user clicks on the "Product Class" button on the main Parts Trader page in a step 162. The user will be presented with an graphic alphabetical key pad representing the first letter of the product class of the product the user is looking for, and a key (button) to indicate that all classes of products are to be displayed. In a step 164, the user determines whether to limit the search to products beginning with a particular letter. If the user chooses not to limit the classes of products to be displayed, the user clicks the "Display All Codes" button, in a step 166. If the user chooses to limit the displayed classes of product to classes starting with a particular letter, the user clicks, in a step 168, on the alphabet letter with which that the product class begins. For example, to locate "Connectors", the user clicks the letter "C" on the keypad display. The user is presented with a list of product classes with the chosen constraints in a step 170. In the example, the user would be presented with a list of the product classes that start with the letter "C". If the user had clicked the "Display All Codes button" in the step 166, the entire list of product classes would be displayed. Beside each product class listing is the manufacturer name of the products. The keypad remains displayed, and the user can return to step 164 to redefine the search restriction.

If no product classes started with the letter selected by the user, e.g., the "C" in the above example, the user would be presented with an error message informing the user that no items met the parameters of the request. The keypad would still be displayed, allowing the user to select a different letter or to select the "Display All Codes" button. That is, if a search returns a null result, the information network makes this known to the user, and displays the search entry form for re-entry of search parameters. Preferably, this form of error handling is utilized in all searches for all functions of the information network operating process 100 and will not be further discussed herein.

The user locates each listing of the product class of the item desired, and observes which manufacturer's codes are shown next to each listing. The user clicks on the entry for the product class which is associated with a desired manufacturer in a step 172. The user is then presented with a search page for locating a particular item by part number in the product class of the item which is manufactured by the selected manufacturer.

In a step 174, the user can search for a part number by entering part or all of the part number, indicate that the entered numbers are an initial string of the part number desired, and initiate a search. Alternatively, in a step 176, the user can search for a part number by entering part or all of the part number, indicate that the entered numbers are a string contained somewhere in the part number desired, and initiate a search. In either case, the string the user enters for the part number can be numbers, letters, non-alphanumeric symbols, or any combination thereof.

In a step 178, the information network displays, in addition to the search form that remains visible, the results of the search. The information displayed includes, for each owner having a part for sale which is manufactured by the selected manufacturer in the selected product class, a line listing the part number of an item fitting the search criteria, the description of the item, the code for the owner of the item, the quantity of the item for sale, and the unit of measure the price is based on. In a step 180, the user clicks on a selected one of the displayed owner codes. In a step 182, the information network displays, in addition to the search form and the results of the search, which remain visible, contact information for the selected owner, including such information as the name of the owner, address, the name of a designated contact person, and telephone and fax numbers.

After the user is finished searching by product class, the user can click on a displayed "Parts Trader" link to return to the main Parts Trader page. From the main Parts Trader page the user can search by manufacturer, as described below, or return to the main Depot page, or to the information network home page.

To search by manufacturer, in a step 184, the user clicks on the "Search By Manufacturer" button on the main Parts Trader page. The user is presented with a graphic alphabetical keypad with an alphabet and a "Display All Codes" button. In a step 186, the user decides whether to select all manufacturers' codes or restrict the search to manufacturers' codes that start with a particular letter. In a step 188, the user clicks on the "Display All Codes" button to select all manufacturer's codes for display. Alternatively, in a step 190, the user clicks on a letter button of the alphabetical keypad to select to restrict the search to just manufacturer's codes starting with the selected letter.

In a step 192, the information network displays a list of the selected manufacturer's codes, and the associated manufacturer's names. The keypad remains displayed, so that the user can return to the step 186 to redefine the search. In a step 194, the user clicks on a selected manufacturer's code. The user is then presented with a search page for locating, by part number, a particular item manufactured by the selected manufacturer.

In a step 195, the user can search for a part number by entering part or all of the part number, indicate that the entered numbers are an initial string of the part number desired, and initiate a search. Alternatively, in a step 196, the user can search for a part number by entering part or all of the part number, indicate that the entered numbers are a string contained somewhere in the part number desired, and initiate a search. In either case, the string the user enters for the part number can be numbers, letters, non-alphanumeric symbols, or any combination thereof.

In a step 197, the information network displays, in addition to the search form that remains visible, the results of the search. The information displayed includes, for each owner having a part for sale which is manufactured by the selected manufacturer, a line listing the part number of an item fitting the search criteria, the description of the item, the code for the owner of the item, the quantity of the item for sale, and the unit of measure the price is based on. In a step 198, the user clicks on a selected one of the displayed owner codes. In a step 199, the information network displays, in addition to the search form and the results of the search, which remain visible, contact information for the selected owner, including such information as the name of the owner, address, the name of a designated contact person, and telephone and fax numbers.

After the user is finished searching by manufacturer, the user can click on a displayed "Parts Trader" link to return to the main Parts Trader page. From main Parts Trader page, the user can search by product class, as described above in step 162, or return to the main Depot page, or to the information network home page.

INVENTORY NETWORKS

Inventory Networks allow selected users to share inventory information. Two general types of inventory networks are contemplated. The first type of inventory network which is contemplated is a Manufacturer Inventory Network, in which participating vendors and manufacturers share inventory information. Manufacturers can use the information network to do online searches of large industrial databases to locate inventory that resides at the vendor's locations. Likewise, vendors can review the manufacturer's inventory availability.

Vendors electronically send their inventory data files for each manufacturer they represent to the information network and the files are merged with the manufacturer's data and other network member's inventories under the same network listing. The merged data is then posted on the information network system. When a manufacturer wishes to review inventory levels at the vendor locations, the manufacturer can simply go to a personal computer, dial into the information network and instantly view the merged listing of inventory for all members using the information network. This enables manufacturers review inventory levels at the vendor warehouse locations which leads to improved production planning, more timely and accurate shipments, and lower inventory costs.

The second general type of inventory network that is contemplated is a Distributor Inventory Network, in which participating vendors share inventory information. The difference is that manufacturers do not participate in the network. Vendors electronically send their inventory data files for each manufacturer they represent to the information network and the files are merged with other network member's inventories under the same network listing. The merged data is then posted on the information network system. When a vendor needs to locate an item, the vendor can simply go to a personal computer, dial into the information network and instantly view the merged listing of inventory for all members using the information network. This enables vendors to work cooperatively through an electronic inventory sharing/viewing exchange network, which can ultimately lead to an increase in customer satisfaction, reduced quick delivery penalties assessed by the manufacturers, and lower inventory costs.

It will be appreciated that a Manufacturer Inventory Network and Distributor Inventory Network are not fundamentally different in operation from a vendor's standpoint, except for access to information about the manufacturer's inventory. Accordingly, only the Manufacturer Inventory Network will be discussed herein.

It should also be noted that much of the Inventory Network function discussed herein, like other functions of the information network process 100, are described as batch functions, rather than real time transactions. That is, as will be discussed below, a vendor will periodically generate a computer file containing a listing of the vendor's inventory, and upload that file to the information network, where it is merged with other vendors' files to generate a picture of the inventory available in the entire distributor network which participates in the inventory network. However, it is specifically contemplated, and within the scope of the invention, that such functions could be done in a real time fashion.

Figure 9:
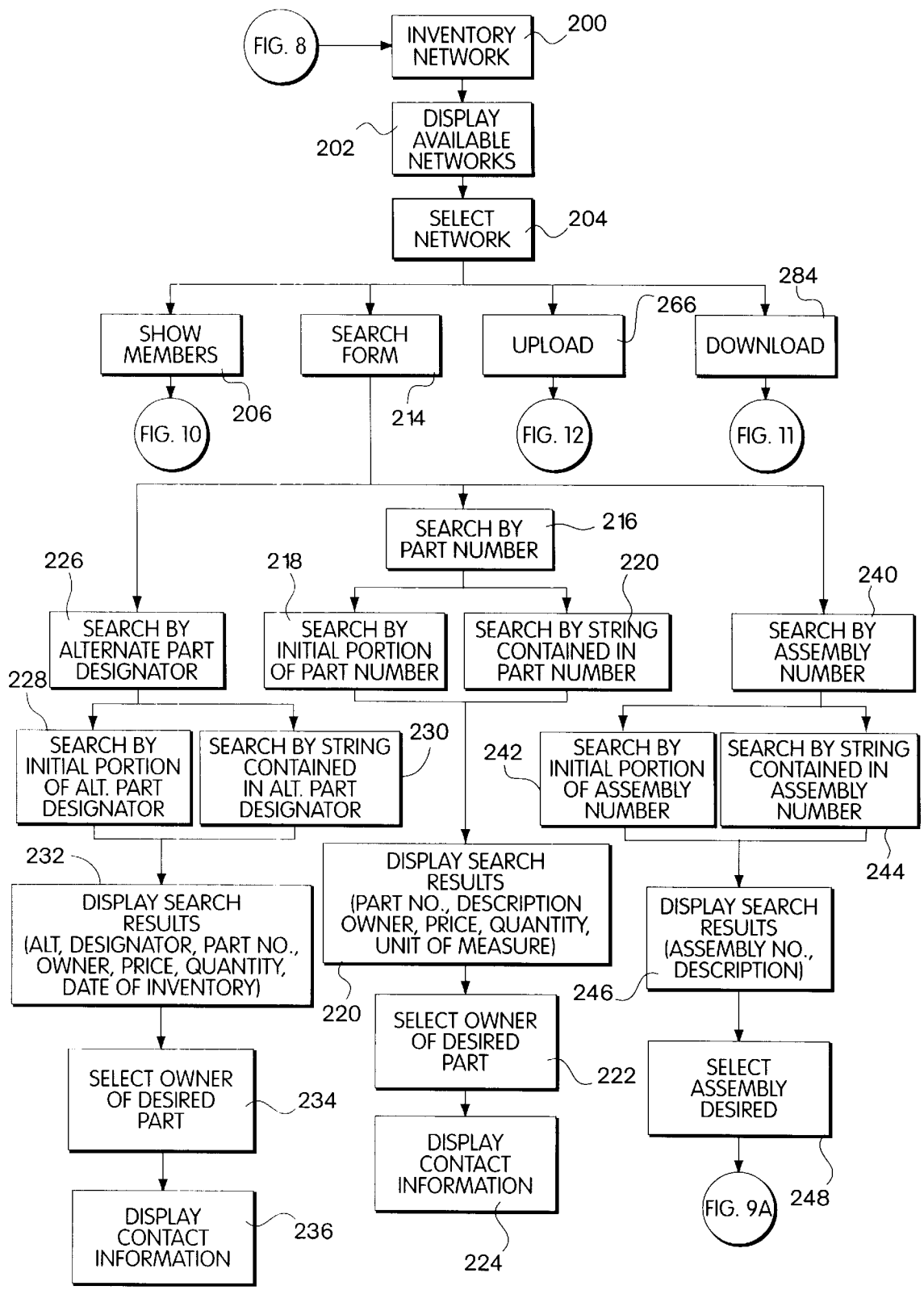
FIG. 9 is a block diagram illustrating a search function of an inventory information-sharing feature of the information network.

From the main Depot page, as briefly discussed above, the user may click on an "Inventory Networks" button, step 156 (FIG. 8), to access the Inventory Networks function. As shown in FIG. 9, the user will be presented with the main Inventory Network page 200. The main Inventory Networks page 200 is divided into three sections: a Banner area, a Working area, and a Quick Link area. The Banner and the Quick Link areas are similar to the Banner and Quick Link areas of the main Depot page 150, described above, with the addition of the navigation button "Depot" which takes the user back to the main Depot page 150 in the Banner. The Working area is where the user can review a list of inventory networks of which the user is a member, including both Manufacturer Inventory Networks and Distributor Inventory Networks, which are determined from the user's login ID and displayed as a step 202. Note that the inventory networks are typically designated by the manufacturer name. This is because even within a given Distributor Inventory Network, all the products about which inventory information is being shared are preferably manufactured by a single manufacturer. The user is also presented a list of available Inventory Network functions: an information network member listing function, a search function, a file upload function, and a file download function.

Before the user can access the inventory network functions, the user, in step 204 clicks on a desired network with the user's mouse to select the desired network.

Figure 10:
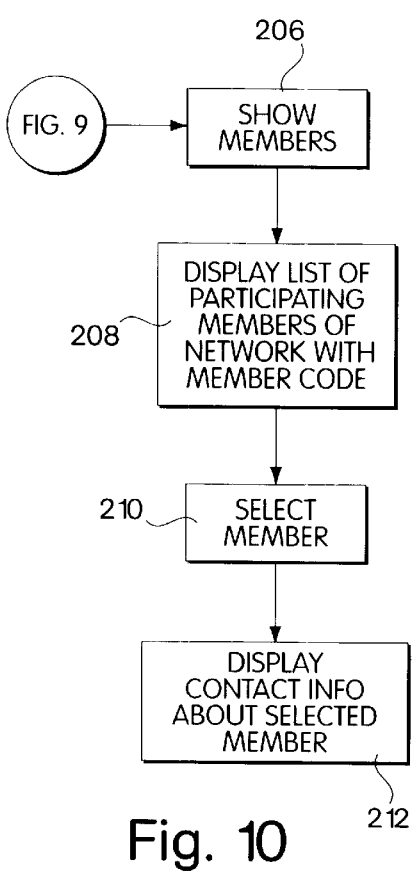
FIG. 10 is a block diagram illustrating a function for displaying the participating users of the information network.

A first Inventory Network function the user may wish to utilize is the Show Members function. The user, after completing step 204, clicks on the "Show Members" button, in a step 206. Referring now to FIG. 10, after the user completes the step 206, the information network displays a list of the participating members of the selected inventory network, including the member code (an abbreviated form of the member name) and the full member name as a step 208. The name of the selected network is also displayed. In a step 210, the user clicks on a selected one of the displayed member codes to select a particular member about which the user wants to learn more information. In a step 212, the information network displays, in addition to the network name and the member listing, which remain visible, contact information for the selected member, including such information as the name of the member, address, the name of a designated contact person, and telephone and fax numbers. The user can then click on the displayed "Back" button to return to the main Inventory Network page 200.

Referring again to FIG. 9, a second function the user may wish to access from the main Inventory Network page 200 is the search function, which enables the user to search for an item within a manufacturer's line and the item's availability at the different vendor locations. The user, after completing the step 204 of selecting a desired inventory network, clicks on the "Search Form" button, in a step 214, causing the search form to be displayed. Depending on the information available on the information network for the selected inventory network, the user may be presented with up to three choices for searching for an item. The user will preferably always be able to search for the item by a part number. The inventory network members may also be sharing alternate part designator information about the item. An alternate part designator may be, for example, a large customer's number for the part. Yet another option which may be available is to search for the item an assembly number (if the item is assembled from sub-components), in order to locate inventory which may be used to assembly the desired assembly item. A Universal Product Code (UPC) may also be used as a search key.

To search by part number, the user first chooses the search by part number function, in a step 216. In a step 218, the user can search for a part number by entering part or all of the part number, indicate that the entered numbers are an initial string of the part number desired, and initiate a search. Alternatively, in a step 220, the user can search for a part number by entering part or all of the part number, indicate that the entered numbers are a string contained somewhere in the part number desired, and initiate a search. In either case, the string the user enters for the part number can be numbers, letters, non-alphanumeric symbols, or any combination thereof In a step 220, the information network displays, in addition to the search form which remains visible, the results of the search. The information displayed includes, for each owner (vendor or manufacturer) having a part for sale, a line listing the part number of an item fitting the search criteria, the code for the owner of the item, the quantity of the item for sale, the price of the item, the date of the inventory listing (the date when the owner said the item was in inventory), and possibly the description of the item.

Note that, preferably the prices displayed within the Inventory Network and the Electronic Commerce functions of the process 100 may be produced either from a stated price supplied by the owner of the item, or from a calculation of the price as a percentage of the manufacturer's list price, based on a discount table supplied by the owner of the item. If neither a stated price nor a discount percentage is supplied by the owner, the listed price will be the manufacturer's list price. Normally, in searches generated in the Inventory Network function, either the price or the discount will be displayed. Preferably, both price and discount will not be displayed, to avoid confusion as to whether the discount applies to the list price or the displayed discount price.

In a step 222, the user clicks on a selected one of the displayed owner codes. In a step 224, the information network displays, in addition to the search form and the results of the search, which remain visible, contact information for the selected owner, including such information as the name of the owner, address, the name of a designated contact person, and telephone and fax numbers. The user uses the displayed "Back" button to return to the main Inventory Network page 200.

To search for an item by an alternate part designator, in a step 226 the user first chooses the "search by alternate part designator" function in the search form displayed after completing the step 214 discussed above. In a step 228, the user can search for an alternate part designator by entering part or all of the alternate part designator, indicate that the information entered is an initial string of the alternate part designator desired, and initiate a search. Alternatively, in a step 230, the user can search for an alternate part designator by entering part or all of the alternate part designator, indicate that the entered information is a string contained somewhere in the alternate part designator desired, and initiate a search. In either case, the string the user enters for the alternate part designator can be numbers, letters, non-alphanumeric symbols, or any combination thereof.

In a step 232, the information network displays, in addition to the search form that remains visible, the results of the search. The information displayed includes, for each owner (vendor or manufacturer) having an item for sale, a line listing the alternate part designator of an item fitting the search criteria, the part number of the item, the code for the owner of the item, the quantity of the item for sale, the price of the item, and the date of the inventory listing.

In a step 234, the user clicks on a selected one of the displayed owner codes. In a step 236, the information network displays, in addition to the search form and the results of the search, which remain visible, contact information for the selected owner, including such information as the name of the owner, address, the name of a designated contact person, and telephone and fax numbers. The user uses the displayed "Back" button to return to the main Inventory Network page 200.

To search for an item by an assembly number, in a step 240 the user first chooses the "search by assembly number" function in the search form displayed after completing the step 214 discussed above. In a step 242, the user can search for an assembly number by entering part or all of the assembly number, indicate that the information entered is an initial string of the assembly number desired, and initiate a search. Alternatively, in a step 244, the user can search for an assembly number by entering part or all of the assembly number, indicate that the entered information is a string contained somewhere in the assembly number desired, and initiate a search. In either case, the string the user enters for the assembly number can be numbers, letters, non-alphanumeric symbols, or any combination thereof.

In a step 246, the information network displays, in addition to the search form which remains visible, the results of the search. The information displayed includes the assembly number and description of items meeting the search criteria. In a step 248, the user clicks on the displayed assembly number of a desired assembly.

Figure 9A:
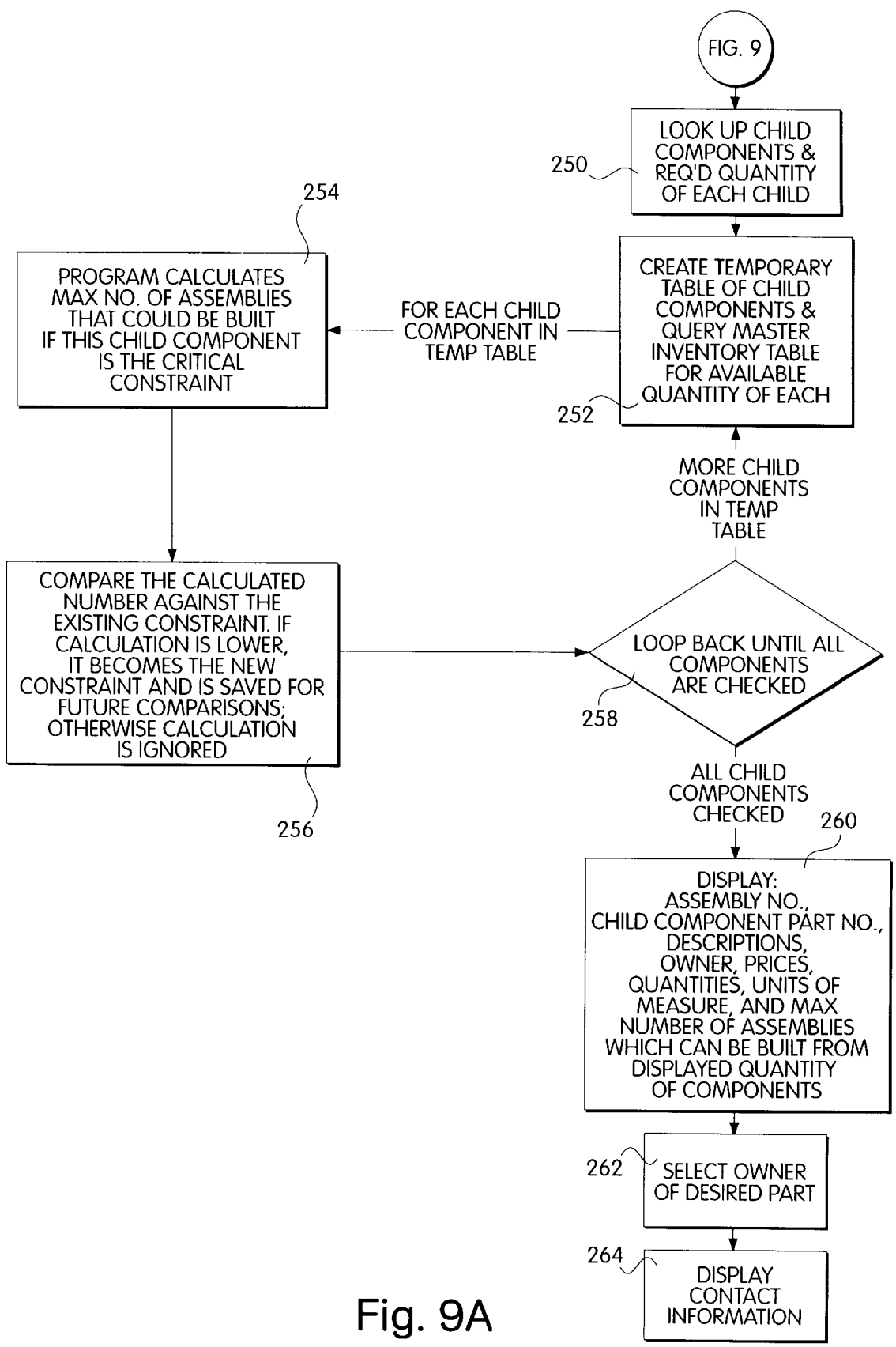
FIG. 9A is a block diagram illustrating an iterative function of the information network for determining the quantity of assemblies that may be assembled from the available sub-components thereof.

Referring now to FIG. 9A, in a step 250, the information network performs a lookup function in the database that forms part of the information network. Specifically, the child components (sub-component parts) of the selected assembly are identified in a look-up table, as are the quantity of each child component required to build one of the selected assemblies. The information network then creates, as part of a step 252, a temporary table of child components of the assembly. As a second part of the step 252, the information network queries the master inventory table of the information network database to determine the quantity of each child component available.

Then an iterative loop is set up, which considers, in sequence, each child component in the temporary table. In a first step 254 of the iterative loop, the information network calculates, from the number of the child components in inventory and the number required to make a single assembly, the maximum number of assemblies that could be built if the child component under consideration were the critical constraint. In a next step 256, the program compares the number calculated in the step 254 against an existing constraint. If the calculated number is lower than the existing critical constraint number, the number calculated in step 254 becomes the critical constraint number, and is saved. The previously calculated constraint number is discarded. Since no constraint existed before the number was calculated for the first child component in the temporary table, the number calculated in the first iteration of the step 254 becomes the critical constraint. If the number calculated in the step 254 is greater than the existing critical constraint number, the calculation is ignored, and the previously calculated critical constraint number remains the critical constraint number. In a step 258, the information network checks to see if all child components have been considered. If not, the iterative loop is repeated, performing the steps 254 and 256 for the next child component in the temporary table. If, on the other hand, all items have been checked, the information network displays the results in a step 260.

The information displayed in the step 260 includes the assembly number of the selected assembly, and the number of complete assemblies in inventory. Also displayed are the part number of the child components required to make the selected assembly, the quantity of each child component required to make up a single assembly, the quantity of each child component in inventory. The display may also suitably include indicate the owner of the displayed components or assemblies. Finally, the maximum number of assemblies which can be built from the displayed quantities of child components is also displayed.

It should be noted here that, if desired, the information network may be programmed to look at only the inventory of selected owners participating in the inventory network. For example, a Manufacturer Inventory Network may be set up to report the quantity of the selected item available from the manufacturer, and the maximum number of assemblies which may be assembled from manufacturer's inventory. In such a situation, it would not be necessary to display an owner code for items displayed in the step 260, since the owner will always be the manufacturer. It should be noted that the information network may be programmed to also generate, for example, reports which separately display the inventory of the user, the inventory of all or selected ones of the other vendors in the selected inventory network, and the inventory of the manufacturer, and separately calculates the number of assemblies which can be built from the child components of each of these groups, or from the entire inventory available on the network. Such customized reports can readily be generated based on the owner codes associated with each inventory item.

In a step 262, the user selects an individual owner of a child component or assembly to find out about which the user desires to learn contact information. In a step 264, the information network displays, contact information for the selected owner, including such information as the name of the owner, address, the name of a designated contact person, and telephone and fax numbers. The user uses the displayed "Back" button to return to the main Inventory Network page 200.

Referring again to FIG. 9, the user, after completing the step 204 of selecting a desired inventory network, can also utilize a file upload function to update information available on the information network about the user, such as the inventory the user has on hand. This is accomplished in a step 266 by clicking on the "Upload" button on the main Inventory Network page 200.

Figure 12:
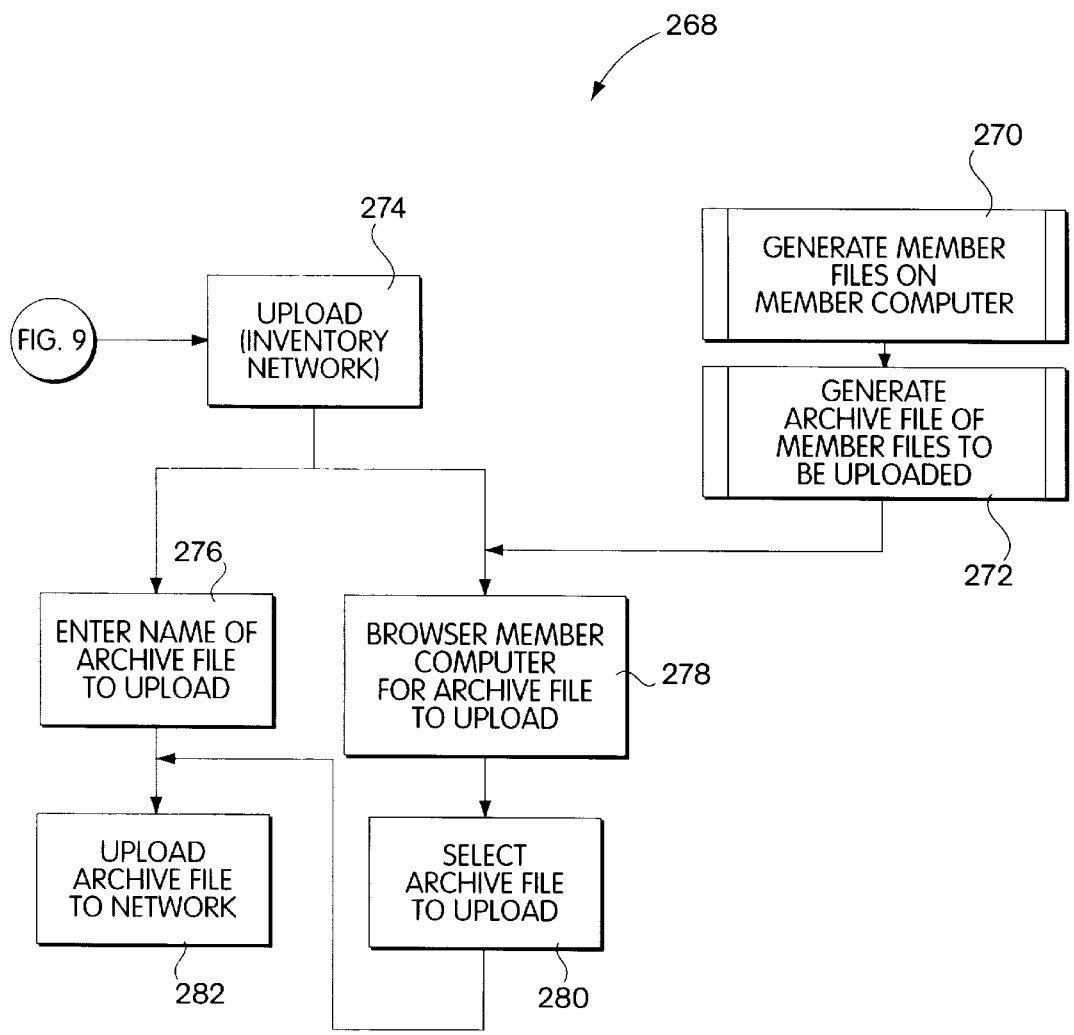
FIG. 12 is a block diagram illustrating a file upload function of the information network whereby data on the network is updated.

Referring now to FIG. 12, the upload function is illustrated generally at 268. As part of the upload function, the user has to generate, in a step 270 performed on the user's computer, the member files to be uploaded. These files are preferably computer lookup tables, some of which are uploaded on a regular basis (e.g., daily) and some of which are uploaded as needed. Many of these tables are used in the Electronic Commerce function, and will be discussed below. However, within the Inventory Network function, the user's inventory is regularly reported to the information network.

Note that, in the preferred embodiment, there is a file naming convention which the user is advised to follow. The inventory files should be named according to the network to which they belong (a user may be a member of more than one network, and the inventory of each network is submitted as a separate inventory file. The file name should equal the user's user ID and a predefined extension which is unique for each network for which the user is a member.

The various inventory files generated by the user are combined with other user files to be uploaded into a single archive file as a step 272. Preferably, the archive file is a compressed file to speed transmission to the information network when the user logs into the information network.

Following selection of the upload function in the step 266, the user will be presented with the Upload File page 274. In a step 276, the user can enter, in the field displayed on the Upload File page 274, the file name and path of the archive file that is ready to be uploaded. If the user does not know the file name and path, the user clicks on the "Browse" button to browse the user's computer for the location of the file as part of a step 278. A dialog box will be presented. The user selects the drive from which the user is uploading the file. The user identifies the type of file the user is looking by highlighting "All files" or highlighting the extension corresponding to the file extension of the archive file that the user is uploading. Once the user has highlighted the chosen file type, the user locates the subdirectory or folder in which the archive file is located. The files corresponding to the file type entered will be displayed. The user then selects the displayed archive file for uploading as a step 280. In a final step 282 of the upload function, the user then clicks on the "Upload File" button to upload the file selected in the steps 276 or 280 to the information network.

Figure 11:
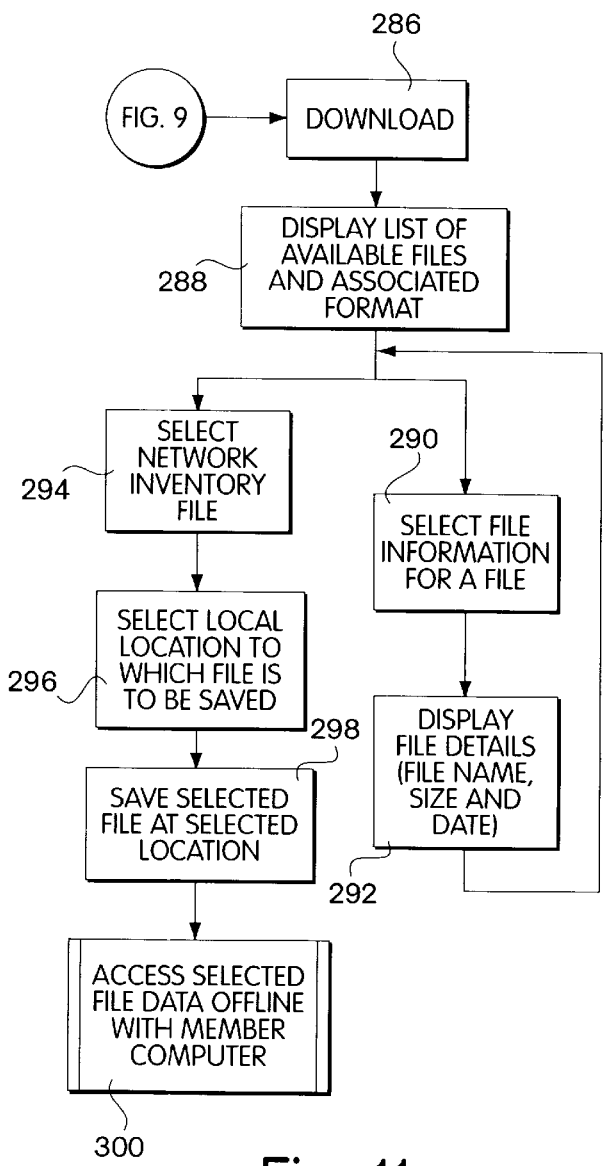
FIG. 11 is a block diagram illustrating a download function of the information network enabling off-line access to network information.

Referring again to FIG. 9, after completing the step 204 of selecting a desired inventory network, the user can also utilize a file download function to retrieve updated information relating to the other members of the network (such as inventory information and member contact information). This will permit the user to access this information offline in the user's own computer, avoiding the costs which may be incurred for extended online access, such as phone charges. This is initiated in a step 284 by clicking on the "Download" button on the main Inventory Network page 200. The user will be presented with the Download Options page in a step 286 (FIG. 11).

The datafiles for the inventory network the user has selected are listed, in a step 288 by name and size. In the preferred embodiment, the same information is available in a variety of file formats, to simplify importation into different user's business system computers. For example, three different file formats which may be utilized are the ".ZIP" format, in which the file has been compressed using a commonly available ZIP compression utility; the ".Z" format, in which the file has been compressed using a commonly available Unix compression utility; and the ".ASC" format which is used to indicate that the file has not been compressed, that it is an ASCII text file.

Optionally, the information network may include a file customized for a user that includes inventory information and associated data such as the member contact information for all of the user's inventory networks combined into a single file. By downloading such a combined file, the user can avoid repetitively performing the Download function for each inventory network of which the user is a member. Another type of customized file which may be provided to the user is a network inventory file which is formatted in a custom format. Such a custom format would be used when the user's business system computer is running a database program utilizing the custom format. The information network may be provided with translation programs to convert standard data files, such as those discussed above, into data files having the custom format.

In an optional step 290, the user can select the file information function to learn more information about the file. In a step 292, the information network displays additional information about the selected file, such as file name, file size and the date the file was last modified.

Following the steps 288 or 292, the user can select the network inventory file that the user wishes to download, in a step 294. The user will then be presented with a dialog box from which the user can locate the drive, and subdirectory or folder oil user's computer where the user wishes to save the selected file, to complete a step 296. The user then initiates the file download in a step 298. When the download is complete, the user will be returned to the Download Options page. The user can then access the Inventory Network information in the downloaded file offline, in a step 300. Preferably, all of the Inventory Network functions available online with the information network are implemented on the user's own computer to use with the downloaded file.

It should be noted that another form of Inventory Network is contemplated apart from the Manufacturer's Inventory Network and the Distributor Inventory Network. This third type of Inventory Network is a Buying Group Inventory Network. This Buying Group Inventory Network is a departure from the model where network members are licensed or authorized distributors of a given manufacturer's product. Some differences between a Manufacturer's Inventory Network and a Buying Group Inventory Network which are contemplated are presented below:

A Buying Group Inventory Network is contemplated to serve a large buying association of distributors, generally of a general type of product, such as electrical products. The items bought by the Buying Group members are intended for resale. However, inventory information shared by the Buying Group members relates to products manufactured by a plurality of manufacturers.

The inventory information on a Buying Group Inventory Network can be relevant to a large number of manufacturer's products; some members may view other members as a competitive threat within their geographical region. For example, it may be a competitive advantage to know that a competitor across the street cannot supply a particular part from on-hand inventory. For this reason, a "blocking" function may be added to the standard functionality of the manufacturer-based networks (e.g., the Manufacturer's Inventory Network or Distributor Inventory Network described above). Such a blocking function would enable a member of the Buying Group to specify those distributors which should be blocked from having access to that member's inventory information. When a "blocked" distributor requests information about inventory from the Buying Group Inventory Network, the information about the inventory of the member who blocked the distributor will not appear. In a preferred embodiment of this function, members of such a Buying Group Inventory Network will be limited to on-line review of inventory information, and will not be allowed to download inventory data for off-line searching. The rationale for limiting data review to on-line review is the relative ease of programming to block information about selected member's inventory in an on-line search environment. However, it is contemplated that such blocking could be applied to an off-line search environment as well.

Several methods of searching a Buying Group Inventory Network are contemplated. First, a search by catalog number may be performed. However, since the Buying Group Inventory Network is not manufacturer specific, various components may have the same catalog number. For example, a switch produced by one manufacturer may be given the same catalog number by that manufacturer as a terminal lug produced and numbered by another manufacturer. Thus, the Buying Group member should carefully review the results of a search performed strictly by catalog number. A second search method would be to first select a specific manufacturer, and then search on the appropriate catalog number as assigned to the desired part by the specific manufacturer. A third search method would be to search by Universal Product Code (UPC) code number, a unique identifying number assigned to a manufacturer's product. UPC code numbers may be assigned by a designated trade group, for example. A commodity code number may also be provided by a trade group. A commodity code is a code assigned to all items of the same type, regardless of the manufacturer. For example, all ring terminals of a given size and service may be assigned a single commodity code number, regardless of who makes the ring terminal. A fourth search method which is contemplated would be a search by commodity code number, which would return inventory information about equivalent items by various manufacturers, which items would be available from other Buying Group members who did not block the searcher from information about their inventory.

It is contemplated that, among various suitable ways of inputting this information, the trade group assigning the commodity code numbers could produce a table which would include the commodity code numbers, the UPC code numbers, the Manufacturer's number, pricing information, and a description of the parts. This table could be imported into the database that forms part of the information network. Of course, this information can be input into the database in any suitable fashion.

ELECTRONIC COMMERCE

From the main Depot page, as briefly discussed above, the user may click on an "Electronic Commerce" button in the step 158 (FIG. 8), to access the Electronic Commerce function. The Electronic Commerce function on the information network lets the user access and interact with selected vendors who are members of the information network. The vendors which the user will be able to interact with are those vendors with which the user has entered into an agreement (i.e., a contract) which will govern or regulate the terms of interaction, including sales, between the parties to the agreement. The user may enter into agreements with one or more vendors, which will be referred to herein as the user's vendors. Typically, the user will be restricted to entering into agreements with vendors within whose geographic franchise area the user is located, although that is typically determined by the rules of the franchise agreements entered into with the various manufacturers by the vendors as distributors of the manufacturers' products, and is not a function of the information network.

Within the Electronic Commerce function, the user can browse the user's vendors' inventory data and place orders and quotes with the vendors. The user can review pricing and product availability as well as order and quote status information of transactions that the user has placed in the past. Electronic funds transfer may suitably be facilitated as part of the Electronic Commerce function.

As indicated above, to access the user's vendors' inventory information, the user must first be an established customer of the vendor. In other words, the vendor must have the user's company set up with a customer number. This information is supplied to the information network in an upload function which will be described below.

After the user has clicked on the "Electronic Commerce" button in the step 158, the user is presented with one of two sets of Electronic Commerce functions, depending on whether the user is a vendor or a customer of a vendor. Note that some users can be both a vendor and a customer. For example, vendors on the Inventory Network may use the Electronic Commerce function to be both vendors and customers to each other, to facilitate transfer of inventory identified in the Inventory Network function.

CUSTOMER ELECTRONIC COMMERCE

Figure 14:
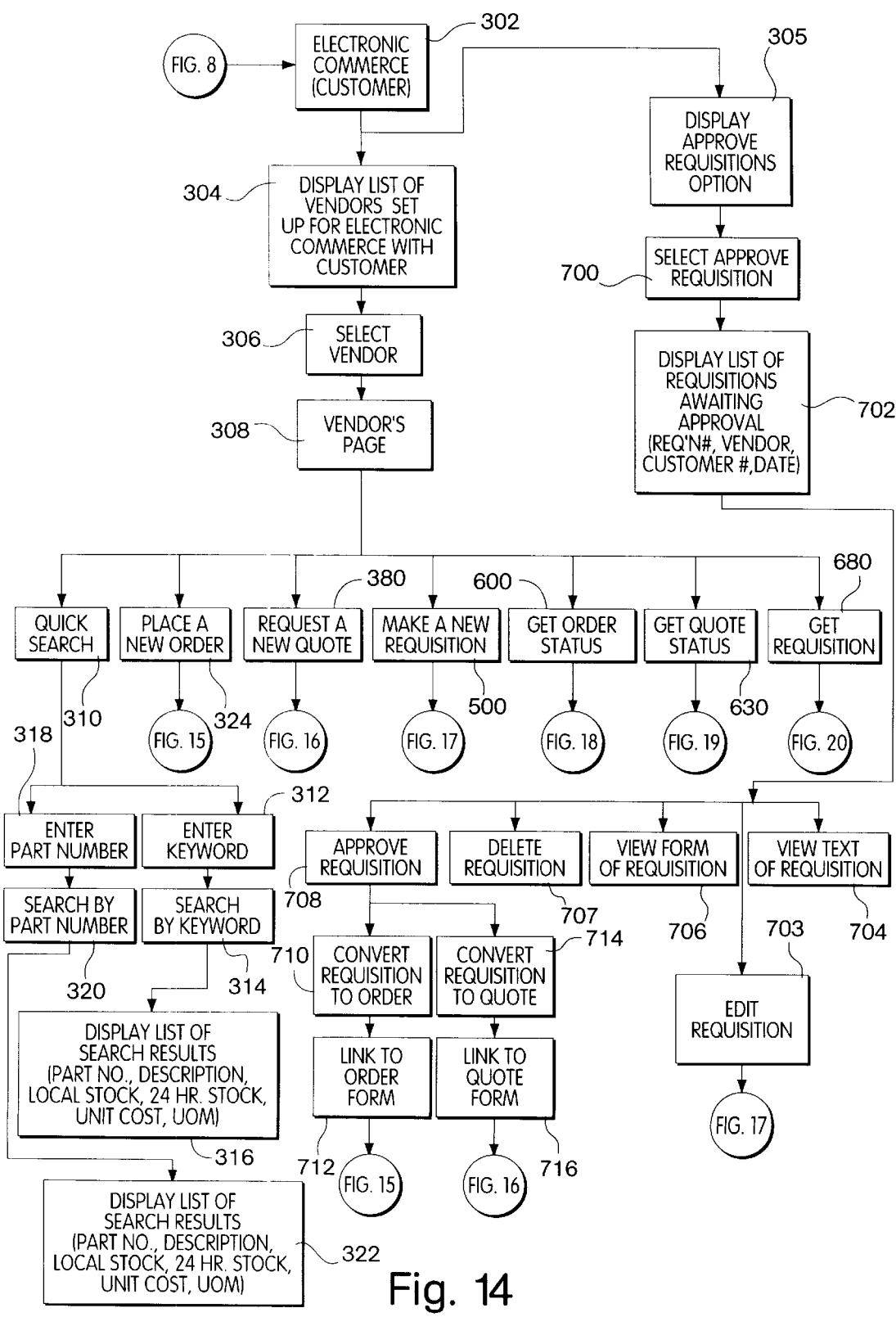
FIG. 14 is a partial block diagram illustrating an electronic commerce function of the information network tailored for use by an end user.

Referring first to FIG. 14, if the user is a customer, then the user will be presented with the Electronic Commerce page 302 as shown below. The Electronic Commerce page 302 presents a list of all of the information network vendors that the user does business with, in a step 304. Also presented on the Electronic Commerce page 302, in a step 305, is an option for "Approve Requisition". As will be discussed below in the section entitled "APPROVE REQUISITIONS", if the user has requisition approval privileges, and selects the Approve Requisition option displayed in the step 305, the user is presented with a list of all open requisitions, sorted by user name.

To initiate a commerce session with a selected vendor, the user clicks on the selected vendor's name in a step 306. The vendor's main page 308 will then be presented. All vendors' pages may look the same and may offer the same menu options. However, menu options are loaded dynamically, and, depending upon the user's privileges with respect to the vendor, these privileges may vary from one vendor to another. Each menu option represents a unique vendor application. The vendor's main page is divided into three sections: a Banner, a Menu Options area, and a Quick Search area 310. The Banner is comprised of the vendor's name and logo, and a navigation button that takes the user back to the Electronic Commerce page.

The Menu Options area lets the user choose the vendor's application that the user may wish to run. The menu options may include: "Place a New Order", "Request a New Quote", "Make a New Requisition", "Get Order Status", "Get Quote Status", and "Get Requisition Status".

QUICK SEARCH

The Quick Search area lets the user quickly search the vendor's database. It would be used if the user wishes to check on inventory availability and pricing without creating a quote, an order, or a requisition. The Quick Search area includes a button for initiating a display of a list of keywords used by the selected vendor for categorizing items.

The user can search for an inventory item by either manufacturer number or keyword. To see a list of the keywords click on the keyword button in the Quick Search area. If the vendor has organized their inventory by keyword, the list will be presented.

In a step 312, the user enters the keyword to search in the field provided and selects the Keyword search function. The user then clicks on the "Quick Search" button to initiate a search by keyword, in a step 314. The user will be presented with a list of the items matching the search criteria as a step 316, including the part number of each item, a description of the item, the local stock quantity, the 24 hour stock quantity, the price of the item, and the unit of measure used to establish the price. The local stock is the quantity of the item that the vendor has in the vendor's own inventory. The 24 hour stock is the stock of the item that the vendor can ship within 24 hours, that is, stock available to the vendor from the manufacturer or other vendors through the vendors Inventory Network, as described above. Of course, time periods other than 24 hours may be used. The user clicks on the displayed "Back" button return to the vendor's page 308.

To search by manufacturer's part number, the user enters at least a partial part number for the desired item in the field provided in the Quick Search area, and selects the Manufacturer Part Number search function in a step 318. The user then clicks on the "Quick Search" button to initiate a search, in a step 320. The user will be presented with a list of the items matching the search criteria as a step 322, including the part number of each item, a description of the item, the local stock quantity, the 24 hour stock quantity, the price of the item, and the unit of measure used to establish the price. The user clicks on the displayed "Back" button return to the vendor's page 308.

ORDER ENTRY

The Order Entry application enables a user to browse the selected vendors inventory, pricing, and product availability. The user can add line items to an order, and enter shipping and order administration information at the user's convenience. The user can search for products by part number, partial part number, or keyword. While creating an order, the user can edit or delete line items the user has added to an order, or cancel the order entirely. Once the user has completed an order, the user will not be able to edit it in the Order Entry mode. However, if the vendor has not yet processed the order, the user can edit the order using the Order Status function that will be explained below. If the user has not posted the order on the information network, in a preferred embodiment, the user will not be able to retrieve it using the Order Status function. However, a function may be provided whereby a user can submit an order to a "scratch pad" part of the information network, and then log-off of the network. The order submitted to the scratch pad will not be made available to the vendor. The user could then log-in to the information network, finish the order which had previously been submitted to the scratch pad, and once satisfied that the order is complete, submit the order in the normal manner.

The user can place an order with the vendor selected in the step 308 by clicking on the "Place a New Order" button 324 (FIG. 14).

Figure 15:
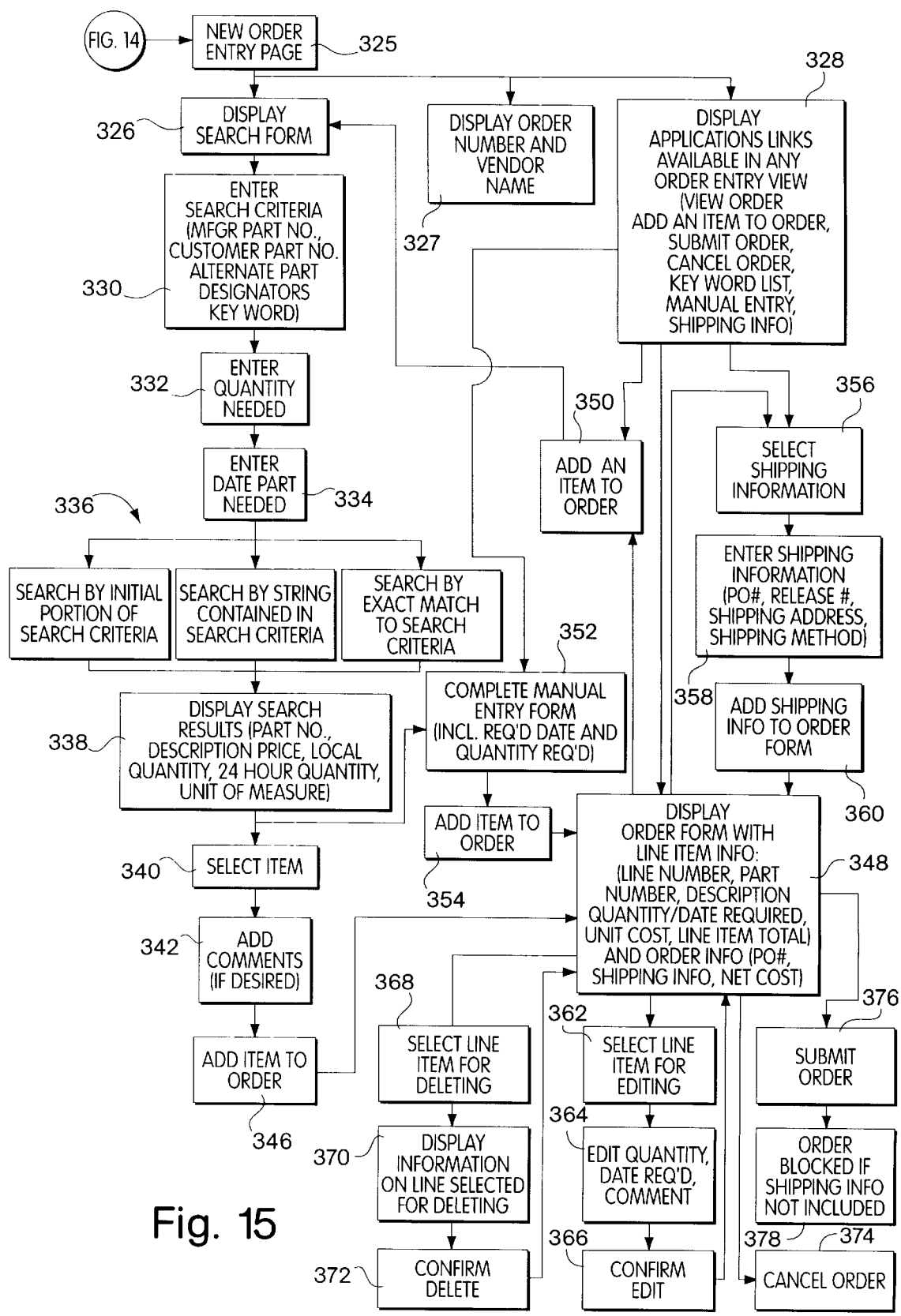
FIG. 15 is a block diagram illustrating an electronic commerce part ordering function of the information network.

The vendor's order entry page 325 will then be displayed (FIG. 15). The page is divided into four sections: Banner, a Search Area, a Dynamic area, and an Application Links area. The Banner section presents the vendor's name and logo as well as the navigation "Back" button used to return to the previous page. It is contemplated that the Banner section may be omitted, and the "Back" button may be moved to another of the three sections, such as the Applications Links area. The Search Criteria area includes a search form displayed in a step 326. The search form allows the user to enter the part information and invoke a search on the vendor's database. The search criteria area of the page is where the user must build the search string for the inventory item that the user wishes to purchase. Most vendors' services let the user search by manufacturer Part Number, customer Part Number, an Alternate Part Number or by Keyword. There is an Item field where the user must enter the search string of the part number or keyword associated with the desired item, and a quantity field where the user must enter the quantity of the item required.

The Dynamic area is where the results of searches are displayed. The Dynamic area is also where the order line items are presented as the user build the order. When the Place a New Order function is first invoked, the selected vendor name and the current order number are displayed in the Dynamic area as a step 327.

The Application Links area is where the user can invoke functions that relate to the order entry application. The Applications Link area is displayed as part of a step 328, performed simultaneously with the steps 326 and 327. Links which are included in the Applications Link area include "View Order", "Add An Item To Order", "Submit Order", "Cancel Order", "Key Word List", "Manual Entry", and "Shipping Information".

In a step 330, the user will normally initiate a search of the database by first selecting the type of search to be conducted, and then entering the search string corresponding to the user's chosen search criteria. The choices for search criteria for finding a desired item will preferably include manufacturer's part number, customer part number, alternate part number, and keyword. The search string would include at least a portion of the appropriate designator. The string the user enters can be characters, numbers, or non-alphanumeric symbols, or a combination thereof. For example, if the user is searching the database by manufacturer's part number, the user enters the part number of the item, or as much of the part number that the user knows, in the displayed Item field.

Next, in a step 332, the user enters the quantity that the user wishes to buy in the Quantity field.

In a step 334, the user enters the date the user requires the item. The date input by the user is checked for accuracy (it must exist and be sometime in the future).

In a step indicated generally at 336, the user indicates whether the search string the user entered in the Item field is at the beginning of the item designator or is contained in the somewhere in the complete item designator, or is an exact match for the item designator. The user completes the step 336 by clicking on the displayed "Search" button to initiate the search.

In a step 338, the results of the search will be displayed in the Dynamic area of the page. The displayed information for each item matching the search criteria will preferably include the part number of the item, a description, a price, a local quantity (the quantity that the vendor has on hand in the vendor's own inventory), a 24 hour quantity (the quantity the vendor can obtain in short order, as discussed above) and the unit of measure for the item.

The price is preferably calculated based on a table uploaded to the information network by the vendor. The table includes a list of the customer ID's for the users authorized to conduct electronic commerce with the vendor, and a discount percentage associated with each customer ID for each product code. This enables the vendor to quote different prices to different customers, with the appropriate discounted price being displayed to the user based on the user's user ID given at log-on. If no discount percentage is given, the displayed price will be list price. While this discounting method is the preferred method for determining price, it is contemplated that other pricing may be used.

In a step 340, the user scrolls (if necessary) through the displayed list until the user finds the item that the user wishes to buy. Once the user has located the item, the user clicks on the "Choose This Item" button to select the item.

In a step 342, the user can enter comments for the line item that will be generated by selecting the item, if the user wishes. The user then clicks on the "Add To Order" button in a step 346. The line item will then be created.

The Order Form page with the newly created line item will be displayed in a step 348. Included on the order form is a line number for each item ordered, with the part number, description, and quantity required of the item, the unit cost for the item and the line item total cost (unit cost multiplied by the quantity required). The Order Form page also includes a Net Cost that is calculated by the information network, which is total of line item total costs, and preferably excludes such costs as taxes, and shipping and handling charges.

To add another line item, the user clicks on the "Add An Item To Order" link in a step 350 to return to the search form displayed in the step 326. The user then executes another search for an inventory item by following steps 330 through 346.

If the user cannot locate the line item by searching by part number or keyword, the user can enter a textual description and the item will be sourced for the user by the vendor. The user clicks on the "Manual Entry" link displayed in the Application Links section to cause the manual entry form to be displayed in a step 352. The manual entry form includes entry fields for part number, vendor description, item description, date required, quantity needed, and unit of measure. The Manual Entry function is especially useful for non-stock or special items that the vendor can obtain, but for which the vendor does not track information in the vendor database. In the preferred embodiment of the invention, the information network requires the user to enter quantity and required date information. In a step 354, the user submits the manual entry order by clicking on the "Add To Order" button displayed at the bottom of the "manual Entry" form.

At any time, if the user wishes to view a summary of the order the user has created, the user can click on the "View Order" link located in the Application Links section of the page to cause the Order Form page to be displayed in a repetition of the step 348.

In a step 356, once the user has entered all of the line items, the user should click on the "Click Here to Enter Shipping Information" link displayed at the top of the dynamic area of the Order Form page. Alternatively, the user can click on the "Shipping Info" link located in the Application Links section of the page to select the Shipping Information entry function. This action causes the Shipping information page to be displayed.

In a step 358, the user is prompted for a Purchase Order (PO) number, and a Release number. The default ship-to information is obtained using the user's customer number to find the appropriate information from the company file and ship-to file supplied by the vendor. The company file is a lookup table that includes, for each customer of the vendor that is authorized to conduct Electronic Commerce with the vendor, a customer login ID, the associated company name, and default address information. The ship-to file is a second lookup table that includes, for each customer of the vendor that is authorized to conduct Electronic Commerce with the vendor, a customer number, and alternate ship-to address or addresses. The user is prompted to change the ship-to address, if the user wishes, and is given the opportunity to select an alternate ship-to address from the database table. A field is provided so that the user can enter an "Attention" string and attach comments to the overall order as part of the shipping information.

The user is also prompted for shipping method and is given a list of choices.

When the user is finished entering shipping information, the user clicks on the displayed "Send Shipping Information" button in a step 360. This adds the shipping information to the Order Form page, which is automatically re-displayed.

The user can capture the displayed Order Form page for printing, accepting the form as is, or go back and make any corrections or deletions, or delete the entire order. The user can also add more line items to the order by clicking on the "Add An Item To Order" link located at the Application Links section of the page.

The user can only edit a line item of an order while the order entry session is still in progress. To do so, the user pulls up the Order Form page, using the "View Order" link in the Application Links section if needed. The user then locates and selects the line item in the current order that the user wishes to edit or modify in a step 362 by clicking on the "Edit" button displayed on the associated line. The user can then change the date required, quantity required, or the comment field in a step 364. Once the user has completed the edits, the user clicks on the displayed "Confirm Edit" button to enter the change to the order as a step 366.

Similarly, the user can only delete a line item of an order entry session in progress. To do so, the user pulls up the Order Form page, using the "View Order" link in the Application Links section if needed. The user then locates and selects the line item in the current order that the user wishes to delete in a step 368 by clicking on the "Delete" button displayed on the associated line. The line item information for the line item is displayed in a step 370. Once the user has determined that the desired line item is displayed, the user clicks on the displayed "Confirm Delete" button to enter the change to the order as a step 372.

In a step 374, the user can cancel the order. The user can only cancel an order that the user is creating. In other words, the user can not cancel an order that has already been submitted while in the order entry application. To cancel an order the user is creating, the user clicks on the "Cancel Order" link in the Application links section of the vendor's order entry page. The user will be presented with a confirmation message indicating that the Cancel Order function will cancel the current order (whose order number is also preferably displayed). To complete the order cancellation step 374, the user clicks on the "Cancel Current Order" button displayed on the page.

If the order is to be submitted rather than cancelled, the user clicks on the "Submit Order" link located at the Application Links section when the user has completed the order, as a step 376. If the shipping information has been entered, the order will then be transmitted to the vendor via the information network. Note, however, that if the user tries to submit the order before the user has entered the shipping information, the order will be blocked as a step 378. The user will be informed that the user cannot submit the order until the user has entered the required shipping data. The user can then click on the "Shipping Info" link located in the Application Links section of the page to select the Shipping Information entry function.

To return to the vendor's Electronic Commerce page, the user clicks on the appropriate displayed button. Alternatively, the user can click on the displayed "Back" button to return to the list of vendors with whom the user does business.

In the preferred embodiment, when a vendor has dialed in and requested a download from the pickup page, if a user has submitted the order, an ASCII text file is built and a unique file name is assigned to that order by the information network. The order is then sent for the vendor to pick up. Although in a preferred embodiment, no electronic mail message (e-mail) is sent, it is contemplated that an e-mail may be sent to the vendor containing the same information about the order. The system also checks a special copy table for records indicating that copies of this order are to be left in other download directories. The orders are placed there as well. Finally, a copy is left in a master repository for back-up and recovery purposes.

A preferred finished order format is as follows:

"An order has been placed.
　　Date: (Date)
　　Time: (Time)
With Supplier: (the name of the vendor)
Customer Number: (customer number)
PO Number: (PO number)
Release Number: (release number)
Department Number (department number)
Ship To Number: (ship to number)
Ship Via Code: (ship via code) (This is a numeric code with a text description obtained from a separate global table)
Attention: (attention)
Ordered By: (ordered by)
Special Instructions: (comments)
Order Date: Order Date"
(The information above appears only once per order, the information below repeats for each item number)
　"Part Number: (part number)
　Part Description: (description)
　Required Quantity: (qty)
　Customer Part Price: (price ea.)
　Total Line Item Price: (total line price)
　Comment: (comment)
　Description: (additional descriptions for non-stock items)"

The above information is formatted and aligned for easy reading and can be sent by the vendor directly to a printer after download. Note that this format is preferably the same format as what is displayed by the View Text Of Individual Transactions Function illustrated in FIG. 13, and the View Text Of Requisition Function illustrated in FIG. 14.

REQUEST A QUOTE

The Request A New Quote function allows a user to browse the distributor's inventory pricing and availability, add line items to a quote, and enter shipping and order administration information. Except for a few changes in data requested, the quote process is similar to the order process. The user may not be prompted for a PO or release number, since a request for a quote is not a sale. The user is prompted to okay the ship to address or change it and fill in the "requested by" field, but lack of shipping information will not prevent a quote from being submitted.

The user can submit a quote with the vendor selected in the step 308 by clicking on the "Request a New Quote" button 380 (FIG. 14).

Figure 16:
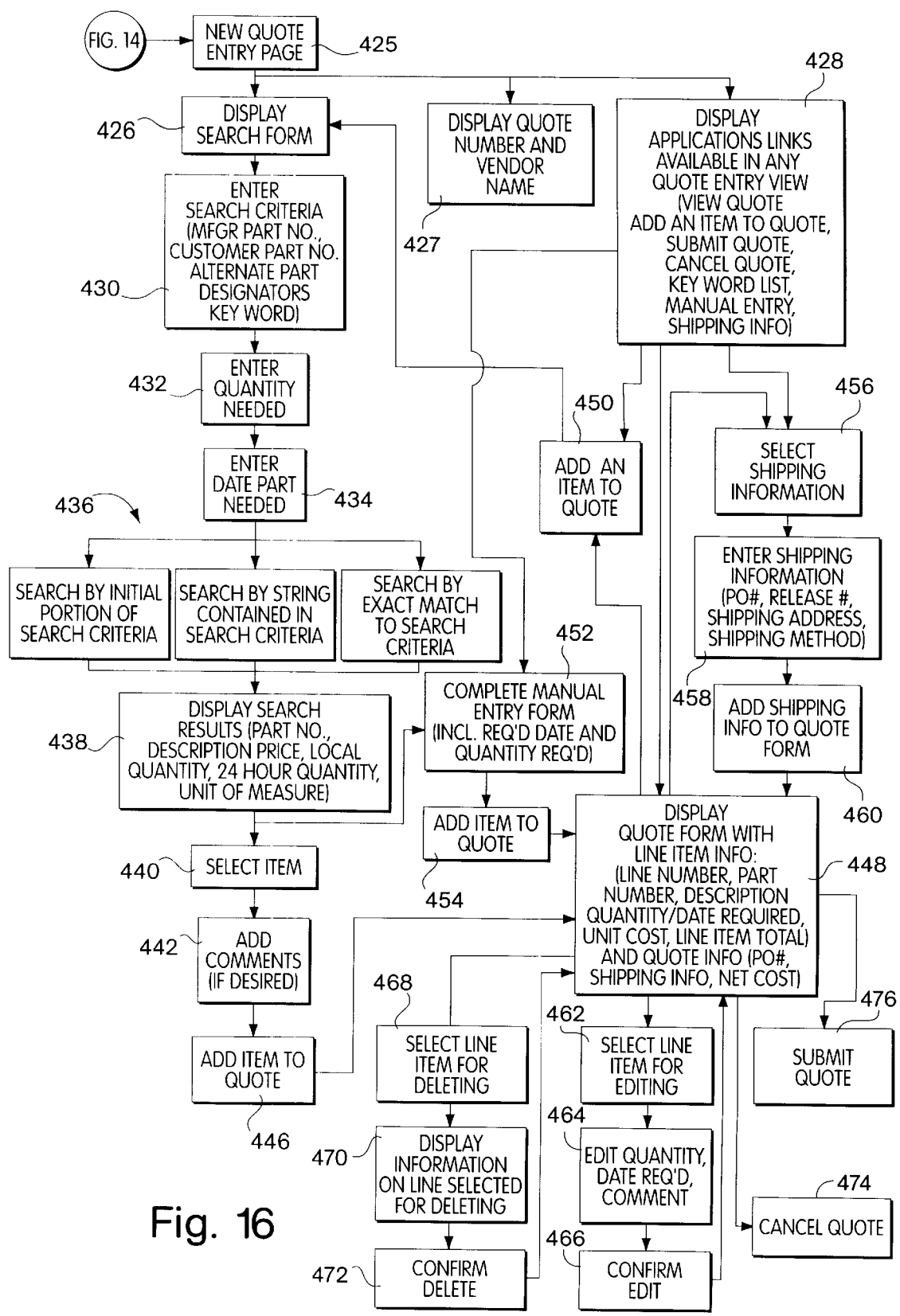
FIG. 16 is a block diagram illustrating an electronic commerce quotation query function of the information network.

The vendor's new quote entry page 425 will then be displayed (FIG. 16). The page is divided into four sections: a Banner area, a Search area, a Dynamic area, and an Application Links area. The Banner presents the vendor's name and logo as well as the navigation "Back" button used to return to the previous page.

It is contemplated that the Banner section may be omitted, and the "Back" button may be moved to another of the three sections, such as the Applications Links area.

The Search Criteria area includes a search form displayed in a step 426. The search form allows the user to enter the part information and invoke a search on the vendor's database. The search criteria area of the page is where the user must build the search string for the inventory item that the user wishes to receive a quote. Most vendors' services let the user search by manufacturer Part Number, customer Part Number, an Alternate Part Number or by Keyword. There is an Item field where the user must enter the search string of the part number or keyword associated with the desired item, and a quantity field where the user must enter the quantity of the item required.

The Dynamic area is where the results of searches are displayed. The Dynamic area is also where the request for quote line items are presented as the user build the request for quote. When the Request A New Quote function is first invoked, the selected vendor name and the current request for quote number are displayed in the Dynamic area as a step 427.

The Application Links area is where the user can invoke functions that relate to the request for quote entry application. The Applications Link area is displayed as part of a step 428, performed simultaneously with the steps 426 and 427. Links which are included in the Applications Link area include "View Quote", "Add An Item To Quote", "Submit Quote", "Cancel Quote", "Key Word List", "Manual Entry", and "Shipping Information".

In a step 430, the user will normally initiate a search of the database by first selecting the type of search to be conducted, and then entering the search string corresponding to the user's chosen search criteria. The choices for search criteria for finding a desired item will preferably include manufacturer's part number, customer part number, alternate part number, and keyword. The search string would include at least a portion of the appropriate designator. The string the user enters can be characters, numbers, non-alphanumeric symbols, or a combination thereof. For example, if the user is searching the database by manufacturer's part number, the user enters the part number of the item, or as much of the part number that the user knows, in the displayed Item field.

Next, in a step 432, the user enters, in the Quantity field, the quantity of the item for which the user is requesting a quote.

In a step 434, the user enters the date the user requires the item. The date input by the user is checked for accuracy (it must exist and be sometime in the future).

In a step indicated generally at 436, the user indicates whether the search string the user entered in the Item field is at the beginning of the item designator or is contained in the somewhere in the complete item designator, or is an exact match for the item designator. The user completes the step 436 by clicking on 35 the displayed "Search" button to initiate the search.

In a step 438, the results of the search will be displayed in the Dynamic area of the page. The displayed information for each item matching the search criteria will preferably include the part number of the item, a description, a price, a local quantity (the quantity that the vendor has on hand in the vendor's own inventory), a 24 hour quantity (the quantity the vendor can obtain in short order, as discussed above) and the unit of measure for the item.

The price is preferably calculated based on a table uploaded to the information network by the vendor. The table includes a list of the customer ID's for the users authorized to conduct electronic commerce with the vendor, and a discount percentage associated with each customer ID for each product code. This enables the vendor to quote different prices to different customers, with the appropriate discounted price being displayed to the user based on the user's user ID given at log-on. If no discount percentage is given, the displayed price will be list price. While this discounting method is the preferred method for determining price, it is contemplated that other pricing may be used.

In a step 440, the user scrolls (if necessary) through the displayed list until the user finds the item that the user wishes to buy. Once the user has located the item, the user clicks on the "Choose This Item" button to select the item.

In a step 442, the user can enter comments for the line item that will be generated by selecting the item, if the user wishes. The user then clicks on the "Add To Quote" button in a step 446. The line item will be then be created.

The Quote Form page with the newly created line item will be displayed in a step 448. Included on the quote form is a line number for each item request for quoted, with the part number, description, and quantity required of the item, the unit cost for the item and the line item total cost (unit cost multiplied by the quantity required). The Quote Form page also includes a Net Cost that is calculated by the information network, which is total of line item total costs, and preferably excludes such costs as taxes, and shipping and handling charges.

To add another line item, the user clicks on the "Add An Item To Quote" link in a step 450 to return to the search form displayed in the step 426. The user then executes another search for an inventory item by following steps 430 through 446.

If the user cannot locate the line item by searching by part number or keyword, the user can enter a textual description and the item will be sourced for the user by the vendor. The user clicks on the "Manual Entry" link displayed in the Application Links section to cause the manual entry form to be displayed in a step 452. The manual entry form includes entry fields for part number, vendor description, item description, date required, quantity needed, and unit of measure. The Manual Entry function is especially useful for non-stock or special items that the vendor can obtain, but for which the vendor does not track information in the vendor database. In the preferred embodiment of the invention, the information network requires the user to enter quantity and required date information. In a step 454, the user submits the manual entry form by clicking on the "Add To Quote" button displayed at the bottom of the Manual Entry form.

At any time, if the user wishes to view a summary of the request for quote the user has created, the user can click on the "View Quote" link located in the Application Links section of the page to cause the Quote Form page to be displayed in a repetition of the step 448.

In a step 456, once the user has entered all of the line items, the user should click on the "Click Here to Enter Shipping Information" link displayed at the top of the dynamic area of the Quote Form page. Alternatively, the user can click on the "Shipping Info" link located in the Application Links section of the page to select the Shipping Information entry function. This action causes the Shipping information page to be displayed.

In a step 458, the user may enter a Purchase Order (PO) number, and a Release number. The default ship-to information is obtained using the user's customer number to find the appropriate information from the company file and ship-to file supplied by the vendor. The company file is a lookup table that includes, for each customer of the vendor that is authorized to conduct Electronic Commerce with the vendor, a customer number, the associated company name, and default address information. The ship-to file is a second lookup table that includes, for each customer of the vendor that is authorized to conduct Electronic Commerce with the vendor, a customer number, and alternate ship-to address or addresses. The user is prompted to change the ship-to address, if the user wishes, and is given the opportunity to select an alternate ship-to address from the database table. A field is provided so that the user can enter an "Attention" string and attach comments to the overall request for quote as part of the shipping information.

The user is also prompted for shipping method and is given a list of choices.

When the user is finished entering shipping information, the user clicks on the displayed "Send Shipping Information" button in a step 460. This adds the shipping information to the Quote Form page, which is automatically re-displayed.

The user can capture the displayed Quote Form page for printing, accepting the form as is, or go back and make any corrections or deletions, or delete the entire request for quote. The user can also add more line items to the request for quote by clicking on the "Add An Item To Quote" link located at the Application Links section of the page.

The user can only edit a line item of a request for a quote while the quote entry session is still in progress. To do so, the user pulls up the Quote Form page, using the "View Quote" link in the Application Links section if needed. The user then locates and selects the line item in the current request for quote that the user wishes to edit or modify in a step 462 by clicking on the "Edit" button displayed on the associated line. The user can then change the date required, quantity required, or the comment field in a step 464. Once the user has completed the edits, the user clicks on the displayed "Confirm Edit" button to enter the change to the request for quote as a step 466.

Similarly, the user can only delete a line item of a request for a quote while the quote entry session is still in progress. To do so, the user pulls up the Quote Form page, using the "View Quote" link in the Application Links section if needed. The user then locates and selects the line item in the current request for quote that the user wishes to delete in a step 468 by clicking on the "Delete" button displayed on the associated line. The line item information for the line item is displayed in a step 470. Once the user has determined that the desired line item is displayed, the user clicks on the displayed "Confirm Delete" button to enter the change to the request for quote as a step 472.

In a step 474, the user can cancel the request for quote. The user can only cancel a request for quote that the user is creating. In other words, the user can not cancel a request for quote that has already been submitted while in the request for quote entry application. To cancel a request for quote that the user is creating, the user clicks on the "Cancel Quote" link in the Application links section of the vendor's request for quote entry page. The user will be presented with a confirmation message indicating that the Cancel Quote function will cancel the current request for quote (whose request for quote number is also preferably displayed). To complete the request for quote cancellation step 474, the user clicks on the "Cancel Current Quote" button displayed on the page.

If the request for quote is to be submitted rather than cancelled, the user clicks on the "Submit Quote" link located at the Application Links section when the user has completed the request for quote, as a step 476. Note that, unlike the Order function, if the user tries to submit the request for quote before the user has entered the shipping information, the request for quote will not be blocked.

To return to the vendor's Electronic Commerce page, the user clicks on the appropriate displayed button. Alternatively, the user can click on the displayed "Back" button to return to the list of vendors with whom the user does business.

In the preferred embodiment, after the quote is built, the user can confirm and send off the quote, modify it, delete it, or capture it for printing. Also, in the preferred embodiment, when a vendor has dialed in and requested a download from the pickup page, if a user has submitted the quote, a submitted quote is named uniquely and placed in the download directory of the vendor. The copy table is checked and a duplicate will be sent to the download area specified there. The master repository receives a duplicate of the quote. If the function is implemented, an e-mail may be sent to the vendor with information about the quote.

REQUISITION

Some information networks may implement a requisition function, of which end-users may wish to take advantage. Requisitions are used in businesses where not all users have the authority to place orders. These users enter the material needed as requisitions. These requisitions are then reviewed and accepted or rejected by others of higher authority in the corporate organization, as will be discussed below. As such, an authentication method exists to link certain login ids with the ability to approve or reject requisitions created by other users. The Requisition function lets the user to browse the user's vendor's inventory pricing and availability, add line items to the requisition, and enter shipping and order administration information. The user can search for inventory by part number or key word.

Briefly, the process for creating a requisition is much the same as the order entry scheme. All the search modes and item input methods from order entry exist in the requisition function as well. The user is prompted for the same information as in the order entry process. When the user has finished building the requisition, the user is prompted for PO number, release number, and requisition number. The user is asked to accept or change the ship-to address. The user can input an "Attention" field and special instructions. The total of the requisition can be displayed when the requisition appears complete. At this point the user can print the requisition locally, modify it, or accept it. Upon acceptance, when submitting the requisition, the user views the total detail of the requisition one last time and can confirm, print or delete the requisition.

This final confirmation writes the created document to the database tables. The requisition number becomes the number input by the user. An information network numbering process guarantee uniqueness. The user ID is captured and written to the tables as the requisition by field.

While creating a requisition, the user can edit or delete line items that the user has created or cancel the requisition completely. When the user completes the requisition, the user posts the requisition to the information network electronically. Different individuals in the user's organization can review the requisition and approve the requisition by converting the requisition to an order or reject the requisition. It is also contemplated that a function may be implemented to allow the reviewing individuals to convert the requisition to a quote. Once the requisition has been approved and converted to an order, the order is sent to the vendor electronically. If the vendor has not processed the order yet, the user can edit the order in the Order Status application.

Now referring to FIGS. 14 and 17, the requisition process will now be described in detail. The user can submit a requisition to the vendor selected in the step 308 by clicking on the "Make a New Requisition" button 500 (FIG. 14).

Figure 17:
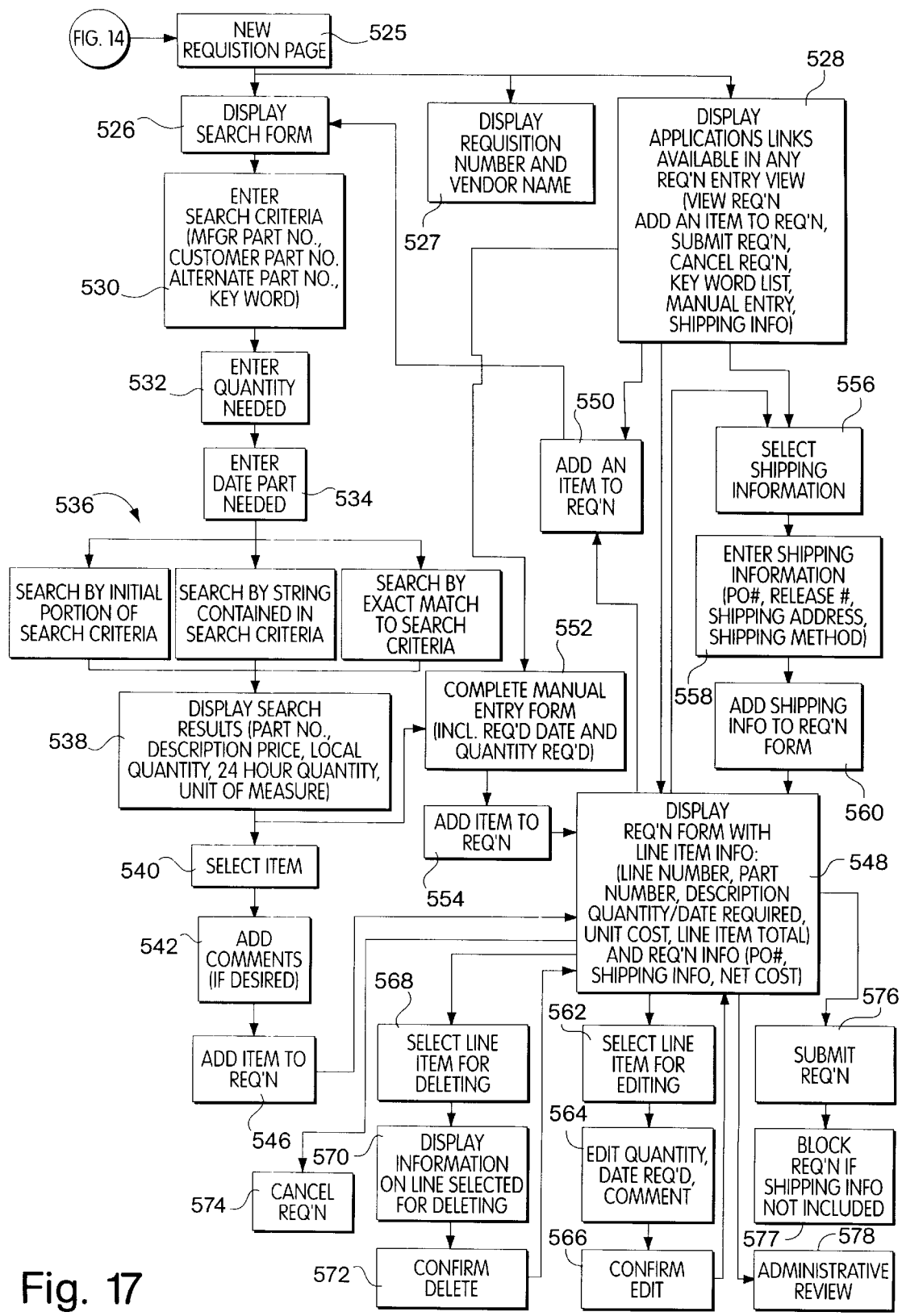
FIG. 17 is a block diagram illustrating an electronic commerce requisition function of the information network.

The vendor's new requisition entry page 525 will then be displayed (FIG. 17). The page is divided into four sections: Banner, a Search Area, a Dynamic area, and an Application Links area. The Banner presents the vendor's name and logo as well as the navigation "Back" button used to return to the previous page. It is contemplated that the Banner section may be omitted, and the "Back" button provided in one of the other sections of the page. The Search Criteria area includes a search form displayed in a step 526. The search form allows the user to enter the part information and invoke a search on the vendor's database. The search criteria area of the page is where the user must build the search string for the inventory item that the user wishes to receive a requisition. Most vendors' services let the user search by Manufacturer Part Number, Customer Part Number, Alternate Part Number, or by Keyword. There is an Item field where the user must enter the search string of the part number or keyword associated with the desired item, and a quantity field where the user must enter the quantity of the item required.

The Dynamic area is where the results of searches are displayed. The Dynamic area is also where the requisition line items are presented as the user build the requisition. When the Requisition function is first invoked, the selected vendor name and the current requisition number are displayed in the Dynamic area as a step 527.

The Application Links area is where the user can invoke functions that relate to the requisition entry application. The Applications Link area is displayed as part of a step 528, performed simultaneously with the steps 526 and 527. Links which are included in the Applications Link area include "View Requisition", "Add An Item To Requisition", "Submit Requisition", "Cancel Requisition", "Keyword List", "Manual Entry", and "Shipping Information".

In a step 530, the user will normally initiate a search of the database by first selecting the type of search to be conducted, and then entering the search string corresponding to the user's chosen search criteria. The choices for search criteria for finding a desired item will preferably include manufacturer's part number, customer part number, alternate part number, and keyword. The search string would include at least a portion of the appropriate designator. The string the user enters can be characters, numbers, non-alphanumeric symbols, or a combination thereof. For example, if the user is searching the database by manufacturer's part number, the user enters the part number of the item, or as much of the part number that the user knows, in the displayed Item field.

Next, in a step 532, the user enters, in the Quantity field, the quantity of the item for which the user is making a requisition.

In a step 534, the user enters the date the user requires the item. The date input by the user is checked for accuracy (it must exist and be sometime in the future).

In a step indicated generally at 536, the user indicates whether the search string the user entered in the Item field is at the beginning of the item designator or is contained in the somewhere in the complete item designator, or is an exact match for the item designator. The user completes the step 536 by clicking on the displayed "Search" button to initiate the search.

In a step 538, the results of the search will be displayed in the Dynamic area of the page. The displayed information for each item matching the search criteria will preferably include the part number of the item, a description, a price, a local quantity (the quantity that the vendor has on hand in the vendor's own inventory), a 24 hour quantity (the quantity the vendor can obtain in short order, as discussed above) and the unit of measure for the item.

The price is preferably calculated based on a table uploaded to the information network by the vendor. The table includes a list of the customer ID's for the users authorized to conduct electronic commerce with the vendor, and a discount percentage associated with each customer ID for each product code. This enables the vendor to quote different prices to different customers, with the appropriate discounted price being displayed to the user based on the user's user ID given at log-on. If no discount percentage is given, the displayed price will be list price. While this discounting method is the preferred method for determining price, it is contemplated that other pricing may be used.

In a step 540, the user scrolls (if necessary) through the displayed list until the user finds the item that the user wishes to buy. Once the user has located the item, the user clicks on the "Choose This Item" button to select the item.

In a step 542, the user can enter comments for the line item that will be generated by selecting the item, if the user wishes. The user then clicks on the "Add To Requisition" button in a step 546. The line item will be then be created.

The Requisition Form page with the newly created line item will be displayed in a step 548. Included on the requisition form is a line number for each item requisitioned, with the part number, description, and quantity required of the item, the unit cost for the item and the line item total cost (unit cost multiplied by the quantity required). The Requisition Form page also includes a Net Cost that is calculated by the information network, which is total of line item total costs, and preferably excludes such costs as taxes, and shipping and handling charges.

To add another line item, the user clicks on the "Add An Item To Requisition" link in a step 550 to return to the search form displayed in the step 526. The user then executes another search for an inventory item by following steps 530 through 546.

If the user cannot locate the line item by searching by part number or keyword, the user can enter a textual description and the item will be sourced for the user by the vendor. The user clicks on the "Manual Entry" link displayed in the Application Links section to cause the manual entry form to be displayed in a step 552. The manual entry form includes entry fields for part number, vendor description, item description, date required, quantity needed, and unit of measure. The Manual Entry function is especially useful for non-stock or special items that the vendor can obtain, but for which the vendor does not track information in the vendor database. In the preferred embodiment of the invention, the information network requires the user to enter quantity and required date information. In a step 554, the user submits the manual entry form by clicking on the "Add To Requisition" link displayed at the bottom of the Manual Entry form.

At any time, if the user wishes to view a summary of the requisition the user has created, the user can click on the "View Requisition" link located in the Application Links section of the page to cause the Requisition Form page to be displayed in a repetition of the step 548.

In a step 556, once the user has entered all of the line items, the user should click on the "Click Here to Enter Shipping Information" link displayed at the top of the dynamic area of the Requisition Form page. Alternatively, the user can click on the "Shipping Info" link located in the Application Links section of the page to select the Shipping Information entry function. This action causes the Shipping information page to be displayed.

In a step 558, the user may enter a Purchase Order (PO) number, and a Release number. The default ship-to information is obtained using the user's customer number to find the appropriate information from the company file and ship-to file supplied by the vendor. The company file is a lookup table that includes, for each customer of the vendor that is authorized to conduct Electronic Commerce with the vendor, a customer number, the associated company name, and default address information. The ship-to file is a second lookup table that includes, for each customer of the vendor that is authorized to conduct Electronic Commerce with the vendor, a customer number, and alternate ship-to address or addresses. The user is prompted to change the ship-to address, if the user wishes, and is given the opportunity to select an alternate ship-to address from the database table. A field is provided so that the user can enter an "Attention" string and attach comments to the overall requisition as part of the shipping information.

The user is also prompted for shipping method and is given a list of choices.

When the user is finished entering shipping information, the user clicks on the displayed "Send Shipping Information" button in a step 560. This adds the shipping information to the Requisition Form page, which is automatically re-displayed.

The user can capture the displayed Requisition Form page for printing, accepting the form as is, or go back and make any corrections or deletions, or delete the entire requisition. The user can also add more line items to the requisition by clicking on the "Add An Item To Requisition" link located at the Application Links section of the page.

The user can only edit a line item of a requisition entry session in progress. To do so, the user pulls up the Requisition Form page, using the "View Requisition" link in the Application Links section if needed. The user then locates and selects the line item in the current requisition that the user wishes to edit or modify in a step 562 by clicking on the "Edit" button displayed on the associated line. The user can then change the date required, quantity required, or the comment field in a step 564. Once the user has completed the edits, the user clicks on the displayed "Confirm Edit" button to enter the change to the requisition as a step 566.

Similarly, the user can only delete a line item of a requisition entry session in progress. To do so, the user pulls up the Requisition Form page, using the "View Requisition" link in the Application Links section if needed. The user then locates and selects the line item in the current requisition that the user wishes to delete in a step 568 by clicking on the "Delete" button displayed on the associated line. The line item information for the line item is displayed in a step 570. Once the user has determined that the desired line item is displayed, the user clicks on the displayed "Confirm Delete" button to enter the change to the requisition as a step 572.

In a step 574, the user can cancel the requisition. The user can only cancel a requisition that the user is creating. In other words, the user can not cancel a requisition that has already been submitted while in the requisition entry application. To cancel a requisition the user is creating, the user clicks on the "Cancel Requisition" link in the Application links section of the vendor's requisition entry page. The user will be presented with a confirmation message indicating that the Cancel Requisition function will cancel the current requisition (whose requisition number is also preferably displayed). To complete the requisition cancellation step 574, the user clicks on the "Cancel Current Requisition" button displayed on the page.

If the requisition is to be submitted rather than cancelled, the user clicks on the "Submit Requisition" link located at the Application Links section when the user has completed the requisition, as a step 576. In a preferred embodiment, the requisition will be blocked if the user tries to submit the requisition before the user has entered the shipping information. However, it is contemplated that in some embodiments, the requisition will not be blocked if the shipping information is not present.

To return to the vendor's Electronic Commerce page, the user clicks on the appropriate displayed button. Alternatively, the user can click on the displayed "Back" button to return to the list of vendors with whom the user does business.

The requisition processes and tables, while similar to orders and quotes have some differences. The information supplied to the detail and header tables in the vendor's database is supplied by customers. The vendors do not update this information and in many cases do not know this information exists. Also, the information created within the requisition cycle creates, modifies, and deletes database table records.

ORDER STATUS

The Order Status function on the information network lets the user review orders that the user has previously placed with the user's vendors. The orders are grouped into three categories: New Orders, Orders in Process and Processed Orders. The user can review the line item details of any order listed. All new orders can be edited or deleted.

The user can review orders that the user has previously placed with the user's vendor, selected in the step 308, by clicking on the "Get Order Status" button 600 (FIG. 14).

Figure 18:
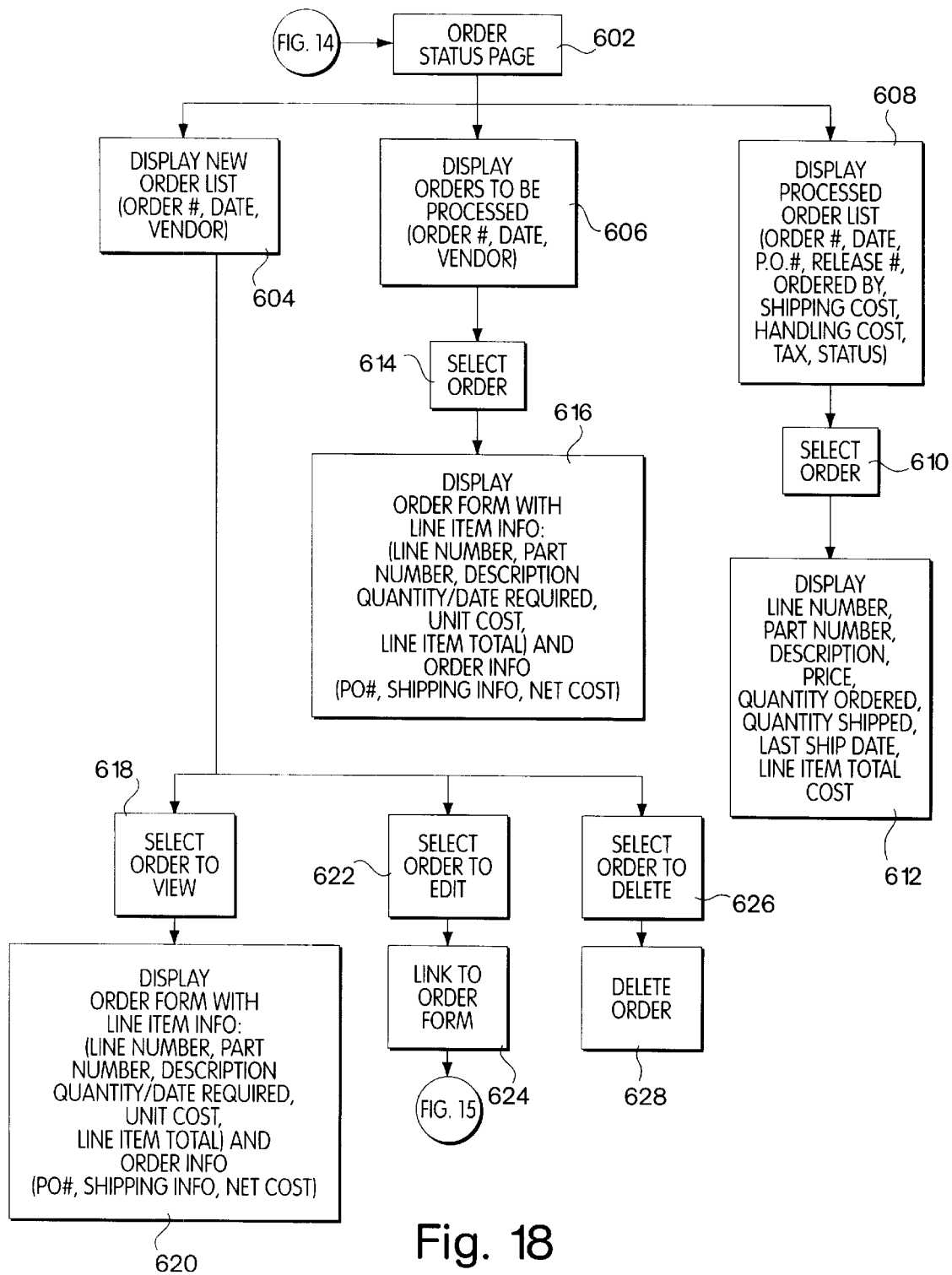
FIG. 18 is a block diagram illustrating an electronic commerce order status function of the information network.

The vendor's Order Status page 602 will then be displayed (FIG. 18). The vendor's Order Status page 602 is divided into four sections: Banner, Links, New Orders, Orders in Process and Processed Orders. Note that, instead of presenting a Processed Orders section on the Order Status page 602, it is contemplated that a separate page (not shown) may be provided to display processed orders, with a navigation button provided on the Order Status page 602 to send the user to the separate page displaying processed orders. The functionality of the separate page displaying processed orders would be the same as the Processed Orders section of the Order Status page 602 with respect to the processed orders.

Preferably, the display is provided with a scrolling function to permit the sections of interest to be displayed in sufficiently large type for normal viewing with a number of orders listed in each of the New Orders, Orders in Process, and Processed Orders sections. The Banner presents the vendor's name and logo as well as the "Back" navigation button to return to the previous page. Again, it is contemplated that the Banner section may be omitted, with the "Back" navigation button being moved to another section of the Order Status page 602.

The Links section lets the user move directly to the beginning of each of the list of New Orders, Orders to be Processed, or Processed Orders, without scrolling.

The New Orders section lists, in a step 604, all new orders that the user has created. New Orders section preferably displays new orders in sequential order by date, and includes a listing of the order number, the date of the order, and the vendor name (which is the vendor selected in the step 306 (FIG. 14).

The Orders to be Processed section lists, in a step 606, orders that the user as created and that are waiting to be processed on the vendor selected in the step 306 (FIG. 14). The Orders to be Processed section also preferably displays the orders awaiting processing by the vendor in sequential order by date, and likewise includes a listing of the order number, the date of the order, and the vendor name.

The Processed Orders section lists, in a step 608 performed simultaneously with the steps 604 and 606, orders that the user has created that have been processed by the vendor. The Processed Orders section preferably displays the processed order in sequential order by the date the order was processed by the vendor. The Processed Orders section preferably displays, for each processed order, the order number assigned by the vendor, the date the order was processed by the vendor, the purchase order number, the release number assigned by the user, "ordered by" information (identification of the user who placed the order), shipping cost, handling cost, tax, and status (assigned by vendor).

To review the line item details of any order in the Processed Orders section, in a step 610 the user clicks on the order number to select the order to be reviewed. In a step 612, the information network displays the line item information for the order, including line number, part number, description, price, quantity of the item ordered, quantity shipped (note that one status which might be displayed in the step 608 above is an indication that some items are on backorder), last shipping date, and the total cost for the line. When the user is finished reviewing the line item detail, the user can click on the "Back" button to return to the Order Status page 602.

Similarly, to review the line item details of any order in the Orders to be Processed section, in a step 614, the user clicks on the order number to select the order to be reviewed. In a step 616, the information network displays the order form with line item information for the order, including line number, part number, description, quantity of the item ordered, date required, unit cost for each item, and the total cost for the line. The order information is also displayed, including the purchase order number, the shipping information (address, shipping method, etc.), and the net cost (exclusive of shipping, handling, and tax). When the user is finished reviewing the line item detail, the user can click on the "Back" button to return to the Order Status page 602.

To review the line item details of any order in the New Orders section, in a step 618, the user clicks on the order number to select the order to be reviewed. In a step 620, the information network displays the order form with line item information for the order, including line number, part number, description, quantity of the item ordered, date required, unit cost for each item, and the total cost for the line. The order information is also displayed, including the purchase order number, the shipping information (address, shipping method, etc.), and the net cost (exclusive of shipping, handling, and tax). When the user is finished reviewing the line item detail, the user can click on the "Back" button to return.

Unlike the Orders to be Processed and the Processed Orders sections, the New Orders section provides control buttons to enable editing or deleting a new order. The user can only edit or delete an order if the order has not begun to be processed by the user's vendor.

To edit a new order, the user locates the order that the user wishes to edit in the New Orders table, and, in a step 622, clicks on the "Edit Item" button. The user will be linked, in a step 624, to the Order Form page displayed in the step 348 above (FIG. 15), with all of the information in the new order displayed. The user can then edit the line items, add line items, delete line items, or perform any other Order function available from the Order Form. Once the user has finished editing the order, the user clicks on the "Submit Order" link of the Order Form page to cause the changes to the order to be sent to the user's vendor.

To delete a new order, the user locates the order that the user wishes to edit in the New Orders table, and, in a step 626, clicks on the "Delete Item" button. The user will be presented with an order summary page. Once the user has reviewed the order and are sure that the user wishes to delete the order, in a step 628 the user clicks on the displayed "Delete This Item" button. The order will be deleted and the user will be returned to the vendor's orders status page 602.

QUOTE STATUS

The Quote Status function on the information network lets the user review quotes that the user has previously placed with the user's vendors. The quotes are grouped into two categories: New Quotes, and Processed Quotes. The user can review the line item details of any quote listed. All quotes (new and processed) can be edited, deleted, converted to an order, or converted to a requisition.

The user can review quotes that the user has previously placed with the user's vendor, selected in the step 308, by clicking on the "Get Quote Status" button 630 (FIG. 14).

Figure 19:
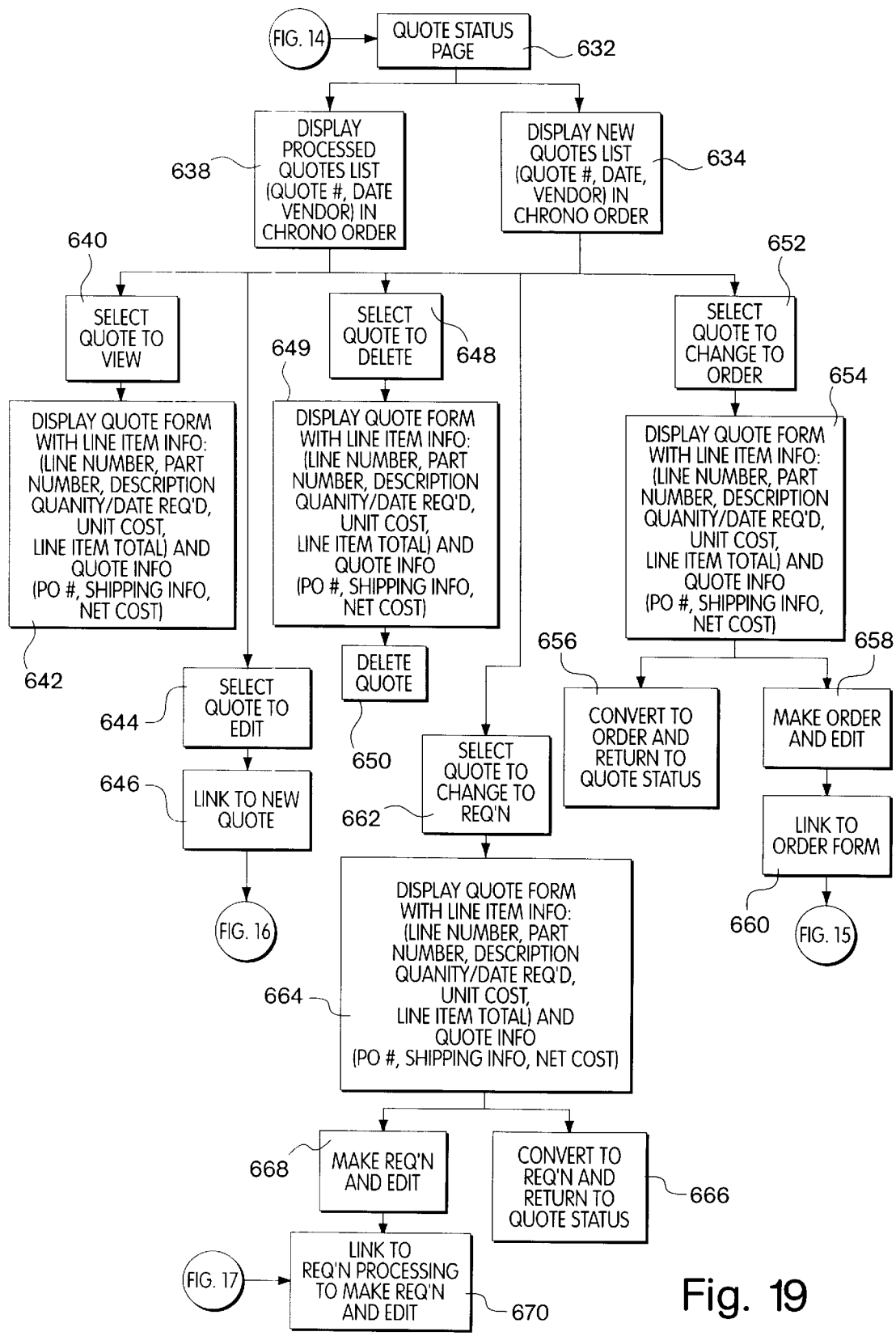
FIG. 19 is a block diagram illustrating an electronic commerce quote status function of the information network.

The vendor's Quote Status page 632 will then be displayed (FIG. 19). The vendor's Quote Status page 632 is divided into three sections: Banner, Links, New Quotes, and Processed Quotes. It is contemplated that instead of being displayed as a section on the Quote Status page 632, the Processed Quotes section can be displayed on a separate page (not shown) accessed by a navigation button (not shown) displayed on the Quote Status page 632. Preferably, the display is provided with a scrolling function to permit the sections of interest to be displayed in sufficiently large type for normal viewing with a number of quotes listed in each of the New Quotes and Processed Quotes sections. The Banner presents the vendor's name and logo as well as the "Back" navigation button to return to the previous page. The Banner may be omitted, and the "Back" button moved to other sections of the page. The Links section lets the user move directly to the beginning of each of the list of New Quotes or Processed Quotes, without scrolling.

The New Quotes section lists, in a step 634, all new quotes that the user has created. New Quotes section preferably displays new quotes in sequential quote by date, and includes a listing of the quote number, the date of the quote, and the vendor name (which is the vendor selected in the step 306 (FIG. 14).

The Processed Quotes section lists, in a step 638 performed simultaneously with the step 634, quotes that the user has created that have been processed by the vendor. The Processed Quotes section preferably displays the processed quote in sequential order by the date the quote was processed by the vendor. The Processed Quotes section preferably displays, for each processed quote, the quote number assigned by the vendor, the date the quote was processed by the vendor, and the vendor name.

For each quote, whether a New Quote or a Processed Quote, several control buttons are displayed: "Edit Item", "Order Item", "Delete Item", and (optionally) "Request Item".

To review the line item details of any quote in either the New Quote section or the Processed Quotes section, in a step 640 the user clicks on the quote number to select the quote to be reviewed. In a step 642, the information network displays the quote form with line item information for the quote, including line number, part number, description, quantity of the item required, date required, unit cost for each item, and the total cost for the line. The quote information is also displayed, including the purchase quote number, the shipping information (address, shipping method, etc.), and the net cost (exclusive of shipping, handling, and tax). When the user is finished reviewing the line item detail, the user can click on the "Back" button to return to the Quote Status page 632.

To edit any quote, the user locates the quote that the user wishes to edit in the New Quotes or Processed Quotes sections, and, in a step 644, clicks on the "Edit Item" button. The user will be linked, in a step 646, to the Quote Form page displayed in the step 448 above (FIG. 16), with all of the information in the selected quote displayed. The user can then edit the line items, add line items, delete line items, or perform any other Quote function available from the Quote Form page. Once the user has finished editing the quote, the user clicks on the "Submit Quote" link of the Quote Form page to cause the changes to the quote to be sent to the user's vendor.

To delete any quote, the user locates the quote that the user wishes to edit in the New Quotes or Processed Quotes sections, and, in a step 648, clicks on the "Delete Item" button. In a step 649, the user will be presented with a quote summary page. The information network displays the quote form with line item information for the quote, including line number, part number, description, quantity of the item required, date required, unit cost for each item, and the total cost for the line. The quote information is also displayed, including the purchase quote number, the shipping information (address, shipping method, etc.), and the net cost (exclusive of shipping, handling, and tax). Once the user has reviewed the quote and is sure that the user wishes to delete the quote, in a step 650 the user clicks on the displayed "Delete This Item" button. The quote will be deleted and the user will be returned to the vendor's Quote Status page 632.

To convert any quote into an order, the user locates the quote that the user wishes to convert into an order in the New Quotes or Processed Quotes sections, and, in a step 652, clicks on the "Order Item" button. In a step 654, the user will be presented with a quote summary page. The information network displays the quote form with line item information for the quote, including line number, part number, description, quantity of the item required, date required, unit cost for each item, and the total cost for the line. The quote information is also displayed, including the purchase quote number, the shipping information (address, shipping method, etc.), and the net cost (exclusive of shipping, handling, and tax).

Once the user has reviewed the quote, if the user wishes to convert the quote to an order without making any changes, the user clicks on the displayed "Make Into Order AS IS" button, in a step 656. The quote will be converted to an order and the user will be returned to the Quote Status page 632 (if the shipping information was entered).

If the user wishes to convert the quote to an order but make changes to it, the user clicks on the displayed "Make Order AND EDIT" button in a step 658. The user will be linked, in a step 660 to the Order Form page displayed in the step 348 above (FIG. 15), with all of the information which was in the selected quote displayed as part of an order in the process of being created. The user can then edit the line items, add line items, delete line items, or perform any other Order function available from the Order Form. Once the user has finished editing, the user clicks on the "Submit Order" link of the Order Form page to cause the order to be sent to the user's vendor.

In some embodiments of the invention, the user may be presented with a "Request Item" to enable the user to convert any quote into a requisition. The user locates the quote that the user wishes to convert into a requisition in the New Quotes or Processed Quotes sections and, in a step 662, clicks on the "Request Item" button. In a step 664, the user will be presented with a quote summary page. The information network displays the quote form with line item information for the quote, including line number, part number, description, quantity of the item required, date required, unit cost for each item, and the total cost for the line. The quote information is also displayed, including the purchase quote number, the shipping information (address, shipping method, etc.), and the net cost (exclusive of shipping, handling, and tax).

Once the user has reviewed the quote, if the user wishes to convert the quote to a requisition without making any changes, the user clicks on the displayed "Make Into Requisition AS IS" button, in a step 666. The quote will be converted to a requisition and the user will be returned to the Quote Status page 632 (if the shipping information was entered).

If the user wishes to make changes to a quote before converting the quote to a requisition, the user clicks on the displayed "Make Requisition AND EDIT" button in a step 668. The user will be linked, in a step 670 to the Requisition Form page displayed in the step 548 above (FIG. 17), with all of the information which was in the selected quote displayed as part of a requisition in the process of being created. The user can then edit the line items, add line items, delete line items, or perform any other Requisition function available from the Requisition Form. Once the user has finished editing, the user clicks on the "Submit Requisition" link of the Requisition Form page to cause the requisition to be submitted.

REQUISITION STATUS

The Requisition Status function lets the user review requisitions that the user has previously placed on the information network. When a requisition is created, it does not get sent to the vendor until it is converted into an order by the Approve Requisition function discussed below with respect to FIG. 14. It is contemplated that in some embodiments, the requisition could be converted either into an order, or into a quote. The user can review the line item details of any requisition listed. All requisitions can be viewed, edited, or deleted.

The user can review requisitions that the user has previously created corresponding to the user's vendor, selected in the step 308, by clicking on the "Get Requisition Status" button 680 (FIG. 14).

Figure 20:
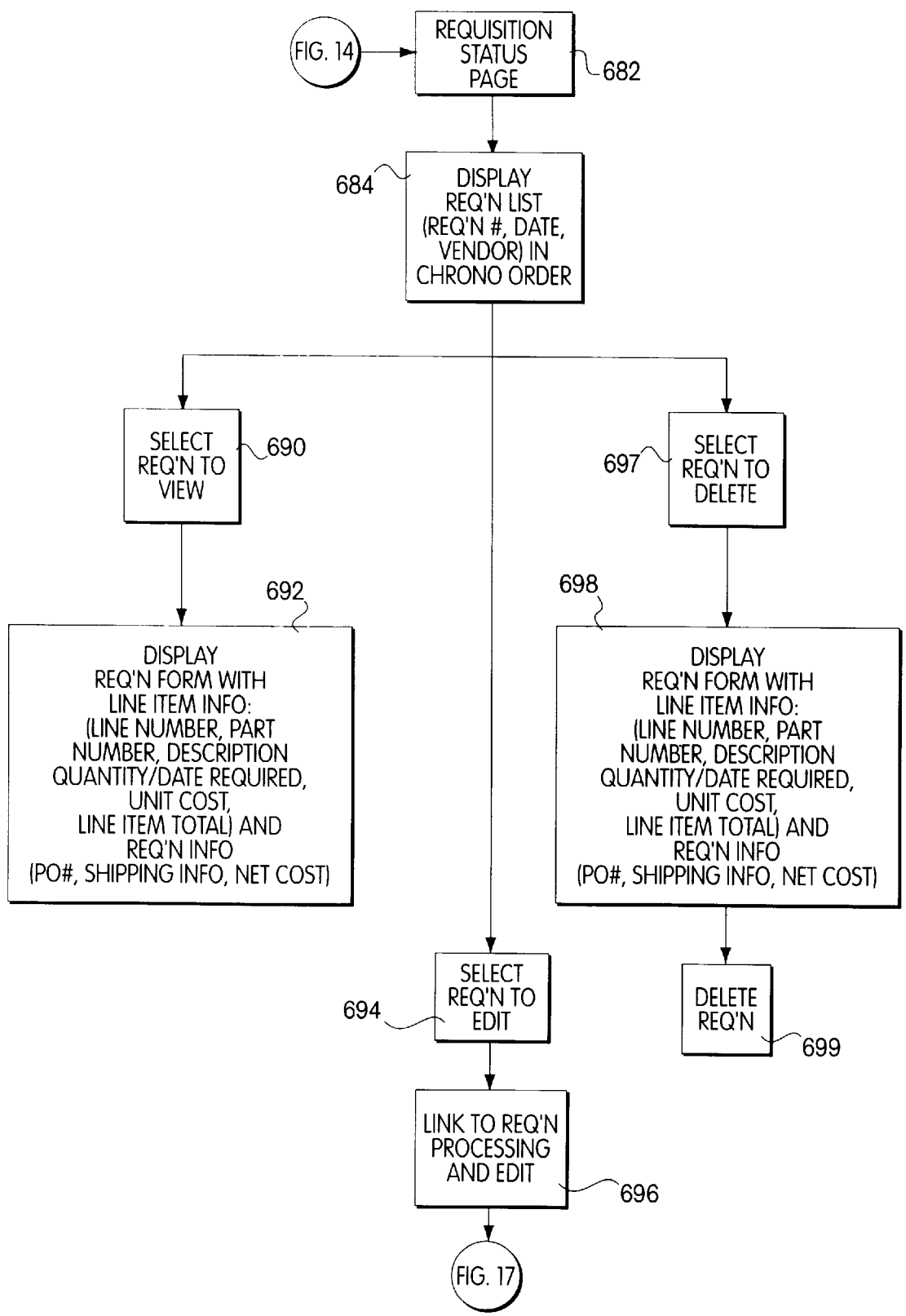
FIG. 20 is a block diagram illustrating an electronic commerce requisition status function of the information network.

The vendor's Requisition Status page 682 will then be displayed (FIG. 20). The vendor's Requisition Status page 682 is divided into two sections: Banner (which contains the selected vendor's name and logo, and a control button to return to the previous page), and a Requisitions section. Preferably, the display is provided with a scrolling function to permit the requisitions of interest to be displayed in sufficiently large type for normal viewing with a number of requisitions listed.

The Requisitions section lists, in a step 684, all new requisitions that the user has created. The Requisitions section preferably displays new requisitions in sequential order by date, and includes a listing of the requisition number, the date of the requisition, and the vendor name (which is the vendor selected in the step 306 (FIG. 14).

For each requisition shown in the Requisitions section, two control buttons are displayed "Edit Item", and "Delete Item".

To review the line item details of any requisition, in a step 690 the user clicks on the requisition number to select the requisition to be reviewed. In a step 692, the information network displays the requisition form with line item information for the requisition, including line number, part number, description, quantity of the item required, date required, unit cost for each item, and the total cost for the line. The requisition information is also displayed, including the purchase order number, the shipping information (address, shipping method, etc.), and the net cost (exclusive of shipping, handling, and tax). When the user is finished reviewing the line item detail, the user can click on the "Back" button to return to the Requisition Status page 682.

To edit any requisition, the user locates the requisition that the user wishes to edit in the Requisitions section, and, in a step 694, clicks on the "Edit Item" button. The user will be linked, in a step 696, to the Requisition Form page displayed in the step 548 above (FIG. 17), with all of the information in the selected requisition displayed. The user can then edit the line items, add line items, delete line items, or perform any other Requisition function available from the Requisition Form page. Once the user has finished editing the requisition, the user clicks on the "Submit Requisition" link of the Requisition Form page to cause the changes to the requisition to be sent registered and stored.

To delete any requisition, the user locates the requisition that the user wishes to delete in the Requisition sections, and, in a step 697, clicks on the "Delete Item" button. In a step 698, the user will be presented with a requisition summary page. The information network displays the requisition form with line item information for the requisition, including line number, part number, description, quantity of the item required, date required, unit cost for each item, and the total cost for the line. The requisition information is also displayed, including the purchase order number, the shipping information (address, shipping method, etc.), and the net cost (exclusive of shipping, handling, and tax). Once the user has reviewed the requisition and is sure that the user wishes to delete the requisition, in a step 699 the user clicks on the displayed "Delete This Item" button. The requisition will be deleted and the user will be returned to the vendor's Requisition Status page 682.

APPROVE REQUISITION

Referring again to FIG. 14, if the user (as identified by the ID supplied during the log-on step 104) is an individual authorized to approve requisitions, an option to approve requisitions is displayed in the step 305. By selection this option, in a step 700, the user can initiate the requisition approval process.

In a step 702, a list of requisitions awaiting the user's approval is displayed, sorted by the user ID of the user that placed the respective requisition. The user can view all requisitions created by members of the information network whose ID's are identified in the database of the information network as belonging to members whose requisitions the user is authorized to approve or reject. Preferably, the list displayed in the step 702 includes not only requisitions for items carried by the vendor selected in step 306, but also includes requisitions placed against all vendors. The requisition summary list displayed in the step 702 preferably includes at least the requisition number, the vendor code, the customer number, and the date of the requisition. In addition, for each requisition, the following controls are displayed: "View Text", "View Form", "Edit Requisition", "Approve Requisition", and "Delete Requisition".

In a step 703, the user can click on the "Edit Requisition" control to view the information contained in the requisition in an editable form. To accomplish this, the user is returned to the requisition entry page displayed in the step 525 (FIG. 17), with the data contained in the requisition already filled out. Once the requisition is modified, the user can submit the requisition in the submission step 576 discussed above. The user can then approve the requisition as will be described below.

The user can, in a step 704, click on the "View Text" control to view the information contained in the requisition in a sequential format. Preferably, file format displayed is similar to that of the finished file format discussed above with respect to the Order Entry function.

The user can, in a step 706, click on the "View Form" control to view the data contained in the requisition in a Packing Slip format, including a section for purchasing information, including Purchase Order number, release number and ship to number. The form view also displays the shipping information, including the company, an attention line (designating an individual at the company), an address, and shipping instructions. The order information included includes, for each line item, a line number, a part number for the item, a description of the item, the quantity required, the date required, a unit cost and the line item total cost. A total cost for the order, excluding tax, shipping, and handling is also displayed.

The user can delete the requisition in a step 707 by clicking on the delete requisition control. Typically, the user will be presented with a page having only the summary of the requisition selected for rejection, and be required to verify that the user is deleting the correct requisition by activating a second delete requisition control.

The user can also approve the requisition by clicking on the Approve Requisition control in a step 708. In one preferred embodiment, the user will be presented with a page having only the summary of the requisition selected for approval. The user can turn the requisition into an order by actuating a "Convert Requisition To Order" control in a step 710. In a step 712, the requisition data is captured, and the user is linked to the Order Form page displayed in step 348 above. There, the data is pulled into the order entry logic for final data input. It is contemplated that other arrangements for approving requisitions may be utilized.

Preferably, the requisition can alternatively be turned into a quote. A "Convert Requisition To Quote" control is preferably also displayed after the user completes the step 708. In a step 714, the user can actuate the "Convert Requisition To Quote" control. In a subsequent step 716, the requisition data is captured, and the user is linked to the Quote Form page displayed in step 448 above. There, the data is pulled into the quote entry logic for final data input.

The proper status and explanation codes are added to the database based upon the approval choice.

When the requisition is deleted in the status views, the status of the deleted transaction is changed to "DL" in the information network tables. The record is removed after a predetermined time period. The requisition record information is only removed from the information network data tables. The customers may told to do this on a regular basis, however, in order to insure that storage space is not being wasted on old information these tables are preferably periodically scanned for dead records.

VENDOR ELECTRONIC COMMERCE

Figure 13:
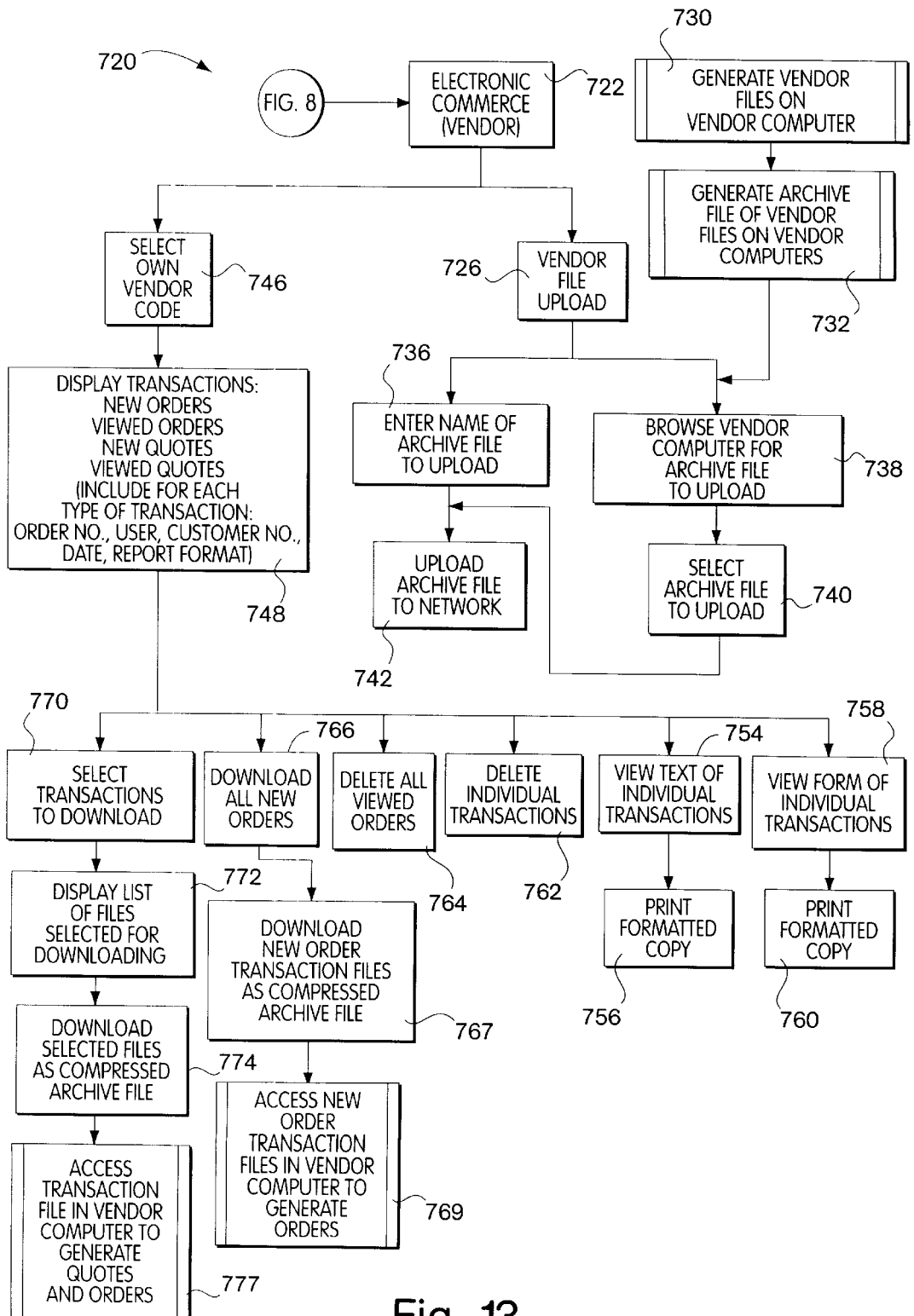
FIG. 13 is a block diagram illustrating an electronic commerce function of the information network tailored for use by a vendor.

Referring now to FIG. 13, the electronic commerce (EC) function for vendors is illustrated generally at 720. Vendors have some needs that customer users of electronic commerce do not. The EC function provides the vendors with access to an area that allows the vendors to download orders and quotes. Although in some embodiments, customers are prohibited from changing information for a transaction that a vendor has already viewed or downloaded, in other embodiments vendors can be sent cancellation notes from customers, which cancellations are downloaded through the same area as the orders and quotes. The EC function 720 also enables vendors to be able to upload their data files to the database server. The orders, quotes and notes that the vendors will be downloading are preferably standard text files, although it is contemplated that these files may be compressed or converted to other file formats, such as EDI 850 format, or standard delimited file formats, before delivery over the information network, if preferred by the vendor. The browser used to interface with the information network should be able to handle this file transfer function rather than merely displaying data from the files. The EC function 720 also enables vendors to maintain this download directory and purge out files that they have already downloaded.

After the user has clicked on the "Electronic Commerce" button in the step 158 (FIG. 8), if the user is a vendor, then the vendor Electronic Commerce page is displayed as a step 722 (FIG. 13).

One action the user may take when the vendor Electronic Commerce page is displayed is to upload files to information network, by clicking on the "Upload" button in a step 726. As part of the upload function, the user has to generate, in a step 730 performed on the user's computer, the vendor files to be uploaded. These files are preferably flat files (ASCII) in a format conducive to importing into database tables, some of which are uploaded on a regular basis (e.g., daily) and some of which are uploaded as needed.

Examples of regularly uploaded files are files containing tables for order status, order detail, quote status, quote detail, requisition status and requisition detail. Other files regularly uploaded are the inventory files discussed above with respect to FIG. 12. The order status table generally includes the summary information displayed in the steps 606 and 608 discussed above. The order detail table generally contains the information displayed in the step 612 above. The tables for quote status and quote detail generally contain the information displayed in the steps 634 and 638, and the information displayed in the steps 642, 649 and 654, respectively. Similarly, the tables for requisition status and requisition detail generally contain the information displayed in the step 684 and the information displayed in the steps 692 and 698, respectively.

Examples of irregularly uploaded files are files containing the company table, the customer part table, the discount table, the keyword table, the ship to table, and the status code table. The company table contains the customer name, number, telephone number, facsimile number, and address for each customer of the vendor. The customer part table is a cross-reference table between customer part number and manufacturer's part number for an item. The discount table is a list of discount percentages cross-referenced to customer number. The key word table is a cross-reference table between keywords and the manufacturer's part number. The ship to table contains alternate ship to addresses keyed to customer numbers. The status code table is a list of status codes and the associated definition used by the vendor.

Note that, in the preferred embodiment, there is a file naming convention which the user is advised to follow, so that the uploaded files can easily be tracked back to the user in case of problems, and to facilitate file handling functions of the information network.

The various files generated by the user are normally combined together in a single archive file as a step 732. Preferably, the archive file is a compressed file to speed transmission to the information network when the user logs into the information network.

Following selection of the upload function in the step 726, the user will be presented with the Upload File page. In a step 736, the user can enter, in the field displayed on the Upload File page, the file name and path of the archive file that is ready to be uploaded. If the user does not know the file name and path, the user clicks on the "Browse" button to browse the user's computer for the location of the file as part of a step 738. A dialog box will be presented. The user selects the drive from which the user is uploading the file. The user identifies the type of file the user is looking by highlighting "All files" or highlighting the extension corresponding to the file extension of the archive file that the user is uploading. Once the user has highlighted the chosen file type, the user locates the subdirectory or folder in which the archive file is located. The files corresponding to the file type entered will be displayed. The user then selects the displayed archive file for uploading as a step 740. In a final step 742 of the upload function, the user then clicks on the "Upload File" button to upload the file selected in the steps 736 or 740 to the information network.

It also noted that much of the Electronic Commerce function discussed herein, like other functions of the information network process 100, are described as batch functions, rather than real time transactions. That is, as discussed above, a vendor will periodically generate computer files, either on a regular or on an irregular basis. The vendor will upload those files in a compressed archive file to the information network, where the data is loaded into a computer database. In this manner, the data is made available to customers from whom the vendor has agreed to electronically receive purchase orders and to whom the vendor has agreed to electronically communicate order status.

However, it is specifically contemplated, and within the scope of the invention, that such functions be replaced with a real time connection to the inventory control system that resides at the vendor's locality. For example, any queries generated by an end user would be relayed over a direct connection from the web server to the inventory control database residing at the vendor's locality. That database would then generate responses to the queries, which the web server would receive and display to the user via the browser interface. Any purchase orders submitted by the end user would then be relayed directly to the vendor's on-site inventory control database, making the necessary changes to order status and on hand inventory in real time. This real time functionality would then replace any batch activities, such as uploading files to and downloading orders from the information network.

Another action the user may take when the vendor Electronic Commerce page is displayed is to electronically pick up orders and quotes. A list of vendors for which the user has "pick up" rights is displayed assembled under the heading "Pick up Orders and Quotes" The user clicks, in a step 746, on the name of the vendor for which orders and quotes are to be picked up (i.e., downloaded).

A list of transactions waiting for the user is displayed in a step 748. The information displayed is a list of new orders placed by the user's customers, a list of previously viewed orders, a list of new quotes placed by the user's customers, and a list of previously viewed orders. For each of these types of transactions, an order number, the user, customer number, the date of the transaction, and an indication of the report format are also displayed.

In a step 754, the user can click on the "View Text" control to view the information contained in a selected transaction in a sequential format. Preferably, file format displayed is similar to that of the finished file format discussed above with respect to the Order Entry function. The user may choose to print out the viewed transaction information in the viewed format in a step 756.

The user can, in a step 758, click on the "View Form" control to view the data contained in the transaction in a Packing Slip format, including a section for purchasing information, including Purchase Order number, release number and ship to number. The form view also displays the shipping information, including the company, an attention line (designating an individual at the company), an address, and shipping instructions. The order information included includes, for each line item, a line number, a part number for the item, a description of the item, the quantity required, the date required, a unit cost and the line item total cost. A total cost for the order, excluding tax, shipping, and handling is also displayed. The user can choose to print out the file information in the viewed format in a step 760.

The user can delete an individual transaction in a step 762 by clicking on the delete transaction control for a selected transaction. Typically, the user will be presented with a page having only the summary of the transaction selected for deletion, and be required to verify that the user is deleting the correct transaction by activating a second delete transaction control.

Preferably, the user can also choose to delete all viewed transactions as a set in a step 764 by actuating the appropriate control.

In a step 766, the user can select to download all new order files at once. As part of this step, the user indicates the target download location on the user's computer. When this feature is selected, in a step 767 the information network downloads all the new order files in a single archive file to the user's business system computer. The archive file is preferably compressed to speed transmission of the file. The user would then access the downloaded file on the user's business system computer to generate new orders for processing in a step 769. In an alternate embodiment of the invention, the user can select to download all new transaction files (orders and quotes) in a single file for processing on the user's business system.

In a step 770, the user selects one or more of the transaction displayed in the step 748 to download. As part of this step, the user indicates the target download location on the user's computer. Once the user is completed selecting the files, the information network displays a list of files selected for downloading in a step 772. If the list is incorrect, the user can make changes. Once the user is satisfied with the list of files to be downloaded, the user clicks on the "Download" button to cause the information network to download the selected files to the selected location in a step 774. The user would then access the downloaded file on the user's business system computer to generate new orders and quotes for processing in a step 777.

CONSOLIDATOR

Referring again to FIG. 8, the information network consolidator function that is initiated in the step 160 is a variation of the Electronic Commerce system. It combines all the Electronic Commerce tools with unique enhancements to facilitate the purchasing consolidation need of many large end users.

The following are brief descriptions of terms associated with the Consolidator function. A "consolidator" is an independent distribution entity that supplies MRO items to a customer. The consolidator may not have a relationship with a manufacturer of items needed by the customer. The consolidator establishes relationships with vendors necessary to meet the needs of the customer for an item. The consolidator takes on the acquisition role as well as the payment relationship. In many cases he issues a single invoice for all items shipped to the customer, receives payment, and then disburses the funds to the appropriate vendor or vendors. The consolidator is usually compensated a percentage of the transaction cost or a flat per line fee for fulfilling these roles. The process can be paper and labor intensive. The information network Consolidator function alleviates some of the cost associated with this processing overhead.

A "tier one partner" supplies a sufficient quantity of an item or items to economically justify maintaining a unique presence on the information network system A "tier two partner" does not supply a sufficiently large quantity of any item to warrant a unique presence on the information network system. Their information files can be handled in two ways. They can be folded into a consolidator's business system (e.g., computer) or merged with the batch file transmissions that information network receives.

A problem overcome in implementing the Consolidator function was to identify the logic required to track the relationships between a consolidator, the consolidator's customers, their user IDs, and the consolidator's tier one partners. An individual user may be a customer of vendors that are not consolidation partners. The information network also has to manage the duplicate order function to insure that each consolidator received their own unique set of orders placed with all tier one partners supplying items to a customer of the consolidator. The consolidator has to have the opportunity to control their own flow of information.

In operation, a customer is identified as one that has a Consolidator relationship. The identity files are set up so that all user IDs and customer numbers associated with that account are keyed toward the associated consolidator.

As an example, suppose the customer initiates an information network session. The customer decides to purchase an item from a tier one partner and navigates to the customer's Electronic Commerce function. The customer has all the normal layers of authentication associated with logging onto the information network. Once the tier one partner has been accessed in the Electronic Commerce function, the customer places an order that is left for the vendor in the normal fashion. The vendor knows that this is a consolidated account and processes it accordingly. For example, the vendor may have special shipping, packing, etc., to be used with each consolidated account. The vendor will supply the item and eventually invoice the consolidator. In addition to the normal process, a duplicate of the order is left in the consolidator's pick-up area. It details the transaction as well as the customer ID and the supplying vendor. The consolidator can view, print, or download these order copies in whatever fashion they choose. The consolidator has complete control over these duplicate orders.

The consolidator will then use these duplicate orders to populate their business system with direct shipment orders. This will allow them to handle the invoicing that comes from the tier one partner for item supplied against the original order.

The consolidator can view the duplicate orders in two ways. The first method sorts the orders by the supplying vendor. For example, if Company A is a consolidator for an item supplied by Company B to Customer C, Company A can view all orders left with Company B by anyone with a user ID assigned to Customer C.

The second method by which the consolidator can view the duplicate orders is to allow the consolidator to view orders placed by any user having a user ID associated with any vendors the consolidator has partnered with. In this method, the ID is the unique item with a many relationship to the vendor partners.

If the customer wishes to order an item from a tier two partner, the customer navigates to the Electronic Commerce port maintained for the consolidator. In this scenario, the consolidator is the order entry point. The order entry function occurs against tables built with the tier two partner resident information. The consolidator then uses their internal business system to break apart the order and transmit the requirement via the agreed upon mechanism. The information network's role in this is to facilitate the order entry process with the Electronic Commerce function. The tier two partner has a minimal presence on the information network but is preferably allowed to have a Mall page to identify items and services provided by the tier two partner.

NETWORK MAINTENANCE

FIGS. 4 and 5 show two processes which are related to the maintenance and smooth running of the information network.

FIG. 4 illustrates generally at 874 a process for "data scrubbing" files uploaded by vendors to update information on the information network. In a first step 876, the operator of the information network locates the files uploaded by the vendor in the appropriate subdirectory of the information network computers.

The data files located in the step 876 may not be in the format used in the information network database, since the vendor who uploaded the files may be using a different database program than the information network. Therefore, in a step 878, the operator uses a suitable file format conversion program to convert the data in the data files into the proper format for the database of the information network, if required.

Once the data in the data files has been formatted, the data files are merged with similar files from other vendors in a first part of a step 880. Once the files are merged into a single data set file, preferably the data is checked to ensure the data entered is standardized in the way that the data is entered. For example, if the part number of an item is 436, and a five digit field is provided for entering the data, some vendors may enter the number as 00436, and others would omit the leading zeros, leaving the unused field spaces blank. When searching and sorting data, non-standard data entry can produce spurious results. Therefore, the step 880 preferably includes a review of the data contained in the combined data file to standardize the data.

After the data set file has been "data scrubbed", the data set file is ready to be placed into the database of the information network. Preferably, the data set file is not appended to the records of the information network, but rather replaces an entire record. The records to be replaced are deleted from the database of the information network in a step 882. In a final step 884, the data set file is loaded into the database to populate the database tables of the information network.

FIG. 5 illustrates generally at 886 a process for maintenance of the various access functions of the information network.

As a first step 888 in the process, the operator loads a Depot table which includes a user ID for each member of the information network, an associated company name, and an indication of the access the member has to the Inventory Network function, to the Parts Trader function, to the Electronic Commerce function, and to the Consolidator function. After an initial load of the Depot table, thereafter preferably the information network provides a feature allowing the operator to change the information in the Depot table without having to completely replace the data table.

In a step 889, the operator loads or revises the access table, which informs the information network of the inventory networks that may be accessed by each user ID.

In a step 890, the operator loads or revises the authority table, which informs the information network of the inventory networks of several specific items as illustrated by the steps 891 through 896 discussed below. Any of the items discussed in the steps 891 through 896 may be revised as part of the maintenance function, step 890. For each record, which occupies a single line in the Authority table, there are four fields, which include a user ID field identifying what user the record applies to, a code field defining the company with which the customer has a buying/selling relationship, a criteria field which defines the type of information contained on the line of the Authority table, and a data field In a step 891, the operator may modify the authority table to change a correlation between the user ID and the associated company name. In this case, the record in the authority table includes the user ID in the ID field, the code field is blank, the Criteria is "Name", and the data field includes a full company name, thereby associating the company name and the user ID. Several user IDs may be associated with each company.

In a step 892, for each user of the information network who makes purchases from a vendor (e.g., end user), the operator may modify a record which includes a user ID in the user ID field, the code of a vendor of whom the user is a customer in the code field, the code CN (for customer number) in the Criteria field, and the customer number assigned to the user by the vendor.

In a step 893, for each user of the information network who may send an order or quote to a vendor, the operator may modify a record which includes a user ID in the user ID field, the name of a vendor with whom the user has order & quote privileges in the code field, the word "order" in the criteria field it identify the record as granting order and quote privilege, and a blank in the data field. Note that a user may have several line in the authority table with the order criteria, if the user is the customer of several vendors.

In a step 894, the operator sets the approval authority of the user with respect to requisitions submitted by other users. The ID of the user is listed in the user ID field, the user ID of another member for whom the user has requisition approval authority, the criteria field has the word "Approve" in it, and the data field is blank.

In a step 895, the operator sets the authority for the user to submit requisitions (but not orders or quotes) on a vendor stock. The ID of the user is listed in the User ID field, the code of a vendor on whose stock the user can make a requisition is listed in the code field, the criteria field has the word "Request" in it, and the data field is blank.

In a step 896, the operator sets the authority for the a user to pick up files containing quotes and orders, etc. from the information network. The ID of the member being granted pickup authority is listed in the User ID field, the ID of a vendor giving the authority is listed in the code field, and the criteria is "pickup". The data field is blank.

In a final maintenance function unrelated to the Authority Table, the operator can set the passwords for users. The passwords are keyed to the user ID. The passwords would include either a password for access to the information network via dial-up service, or a password for accessing the site via a firewall setup at the Internet connection. A second password can be stored which regulates access to the information network database.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A process for distributing items, including the steps of:
   (a) providing a plurality of vendors for selling an item;
   (b) providing an information network by which information about the respective quantity and price of said item each of said vendors has for sale can be shared among vendors, said information network including a Depot portion that includes an Inventory Network function;
   (c) merging said information with information that has previously been sent to the information network;
   (d) establishing an agreement among said vendors in which each of said vendors agrees to sell to any other of said vendors up to said respective quantity of said item at said respective price;
   (e) selecting to utilize the Inventory Network function;
   (f) viewing a list of networks available to the particular user displayed by said information network;
   (g) selecting an information network to utilize;
   (h) selecting a child component that is a sub-component of an assembly; and
   (i) calculating the maximum number of said assemblies that could be built if said child component were the critical constraint.

2. A process for distributing items, including the steps of:
   (a) providing a plurality of vendors for selling an item;
   (b) providing an information network by which information about the respective quantity and price of said item each of said vendors has for sale can be shared among vendors, said information network including a Depot portion that includes an Inventory Network function;
   (c) merging said information with information that has previously been sent to the information network;
   (d) establishing an agreement among said vendors in which each of said vendors agrees to sell to any other of said vendors up to said respective quantity of said item at said respective price;
   (e) selecting to utilize the Inventory Network function;
   (f) viewing a list of networks available to the particular user displayed by said information network;
   (g) selecting an information network to utilize;
   (h) selecting a child component that is a sub-component of an assembly; and
   (i) calculating the maximum number of said assemblies that can be built based on the number of sub-components of the assembly that are available.

3. The process of claim 2 further including the step of utilizing an iterative loop to determine said maximum number.

4. The process of claim 3 wherein said iterative loop further includes the steps of (a) selecting a child component that is a sub-component of an assembly, (b) calculating the number of said assemblies that could be built if said child component were the critical constraint, (c) comparing the number against an existing constraint if any exists, (d) saving the lower of the two numbers as the existing constraint, and (e) continuing steps (b) through (d) until all sub-assemblies have been considered.

* * * * *